United States Patent
Yoshida et al.

(10) Patent No.: US 10,876,405 B2
(45) Date of Patent: Dec. 29, 2020

(54) METHOD FOR REMOVING TURBINE BLADE, REMOVAL DEVICE FOR EXECUTING SAID METHOD, AND ROTOR SET WITH SAID REMOVAL DEVICE

(71) Applicant: Mitsubishi Hitachi Power Systems, Ltd., Kanagawa (JP)

(72) Inventors: Shinji Yoshida, Yokohama (JP); Tadakazu Sakaguchi, Yokohama (JP); Shouhei Ooba, Nagasaki (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 34 days.

(21) Appl. No.: 16/064,320

(22) PCT Filed: Dec. 27, 2016

(86) PCT No.: PCT/JP2016/088856
§ 371 (c)(1),
(2) Date: Jun. 20, 2018

(87) PCT Pub. No.: WO2017/119358
PCT Pub. Date: Jul. 13, 2017

(65) Prior Publication Data
US 2019/0003309 A1  Jan. 3, 2019

(30) Foreign Application Priority Data

Jan. 8, 2016 (JP) .................................. 2016-002699

(51) Int. Cl.
*F01D 5/00* (2006.01)
*F01D 25/00* (2006.01)
(Continued)

(52) U.S. Cl.
CPC .............. *F01D 5/005* (2013.01); *B23P 6/002* (2013.01); *B23P 19/02* (2013.01); *F01D 5/30* (2013.01);
(Continued)

(58) Field of Classification Search
CPC .......... F01D 5/005; F01D 5/30; F01D 25/285; F01D 5/3007; F01D 25/00; F04D 29/64;
(Continued)

(56) References Cited

U.S. PATENT DOCUMENTS 4,455,730 A   6/1984  Guenther
6,416,286 B1 * 7/2002  Roberts ................. B23P 15/006
                                                    29/889.21
(Continued)

FOREIGN PATENT DOCUMENTS

JP          55-78103          6/1980
JP          59-51197          3/1984
(Continued)

OTHER PUBLICATIONS

International Search Report dated Mar. 7, 2017 in International (PCT) Application No. PCT/JP2016/088856, with English translation.
(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A removal device includes a base, a push rod, a rod-moving mechanism and a rod guide. The base is restrained immovably in a first direction. The push rod can protrude from a front surface of the base toward a front side. The rod-moving mechanism is installed on the base. The rod-moving mechanism moves the push rod toward the front side. The rod
(Continued)

guide is attached to the base. The rod guide guides movement of the push rod by the rod-moving mechanism in a second direction that forms an acute angle with respect to the first direction.

6 Claims, 16 Drawing Sheets

(51) Int. Cl.
    *F01D 5/30*           (2006.01)
    *F04D 29/64*         (2006.01)
    *F01D 25/28*        (2006.01)
    *F04D 29/32*        (2006.01)
    *B23P 19/02*        (2006.01)
    *B23P 6/00*          (2006.01)

(52) U.S. Cl.
    CPC ............ *F01D 5/3007* (2013.01); *F01D 25/00* (2013.01); *F01D 25/285* (2013.01); *F04D 29/322* (2013.01); *F04D 29/64* (2013.01); *F05D 2230/70* (2013.01)

(58) Field of Classification Search
    CPC ........ F04D 29/322; F04D 29/34; B23P 6/002; B23P 19/02; F05D 2230/70; F02C 7/00; Y10T 29/53796; Y10T 29/53909; Y10T 29/5393; Y10T 29/49718; Y10T 29/49721; Y10T 29/49318

USPC ..... 29/889.1, 270, 275, 244, 402.01, 402.03
See application file for complete search history.

(56) References Cited

U.S. PATENT DOCUMENTS

| | | | |
|---|---|---|---|
| 7,934,302 B2 * | 5/2011 | Kalmar | ................ F01D 25/285 |
| | | | 29/281.1 |
| 2003/0091399 A1 * | 5/2003 | Nolan | ................... B23D 37/22 |
| | | | 407/15 |
| 2004/0118175 A1 * | 6/2004 | Lawrence | ................ B21D 3/10 |
| | | | 72/31.03 |
| 2010/0229362 A1 * | 9/2010 | Maugans | ................ B21D 3/10 |
| | | | 29/239 |
| 2011/0179645 A1 * | 7/2011 | Silieti | ................... B23P 19/025 |
| | | | 29/889.1 |
| 2015/0128417 A1 | 5/2015 | Laborde | |
| 2015/0218948 A1 | 8/2015 | Bird | |
| 2016/0256991 A1 | 9/2016 | Compton | |

FOREIGN PATENT DOCUMENTS

JP         2011-122474         6/2011
JP         2013-531158         8/2013

OTHER PUBLICATIONS

Written Opinion dated Mar. 7, 2017 in International (PCT) Application No. PCT/JP2016/088856, with English translation.

* cited by examiner

METHOD FOR REMOVING TURBINE BLADE, REMOVAL DEVICE FOR EXECUTING SAID METHOD, AND ROTOR SET WITH SAID REMOVAL DEVICE

TECHNICAL FIELD

The present invention relates to a method of removing a turbine blade in a rotary machine, a removal device for performing the method, and a rotor set including the removal device.

Priority is claimed on Japanese Patent Application No. 016-002699, filed Jan. 8, 2016, the content of which is incorporated herein by reference.

BACKGROUND ART

An axial flow compressor that is one of rotary machines includes a rotor that rotates about an axis, and a casing configured to cover the rotor. The rotor has a rotor shaft, and a plurality of turbine blade rows attached to the rotor shaft. Each of the turbine blade rows is disposed upstream from any one of the plurality of turbine vane rows. A turbine blade row is constituted by a plurality of turbine blades arranged in a circumferential direction with respect to the axis.

In the following Patent Literature 1, an axial flow compressor is disclosed. A rotor shaft of the axial flow compressor has disks corresponding to the plurality of turbine blade rows. Each of the plurality of disks is formed in a disk shape about the axis. The rotor shaft is configured by stacking a plurality of disks in the axial direction. The turbine blade has a blade body extending in the radial direction with respect to the axis to form a blade profile, and a blade root formed inside the blade body in the radial direction. A blade root groove recessed from an outer side in the radial direction toward an inner side in the radial direction, extending in a direction having a component in the axial direction and into which the blade root is inserted is formed in the disk.

CITATION LIST

Patent Literature

[Patent Literature 1]
Japanese Unexamined Patent Application. First Publication No. 2011-122474

SUMMARY OF INVENTION

Technical Problem

In the rotary machine disclosed in Patent Literature 1, the blade root of the turbine blade may become stuck to the blade root groove during a long-term operation. For example, when the rotary machine is inspected or repaired, it may be difficult to remove the turbine blade from the blade root groove without damaging the turbine blade.

The present invention is directed to providing a technology capable of allowing, easy removal a turbine blade from a blade root groove without damaging the turbine blade.

Solution to Problem

In order to achieve the aforementioned objects, a removal device for a turbine blade as an aspect of the present invention includes a base restrained immovably in a first direction; a push rod that is able to protrude from a front surface of the base facing a front side that is one side in the first direction toward the front side; a rod-moving mechanism installed on the base and configured to move the push rod toward the front side; and a rod guide attached to the base and configured to guide movement of the push rod by the rod-moving mechanism in a second direction that forms an acute angle with respect to the first direction.

The disk to which the turbine blade is attached forms a disk shape about an axis thereof. A blade root groove recessed from the outside in the radial direction toward the inside in the radial direction with respect to the axis and extending in an inclination direction inclined with respect to the axis is formed in the disk. The blade root for a turbine blade enters the blade root groove. Further, the rotor shaft is constituted by stacking a plurality of disks in an axial direction. When the turbine blade is removed by the removal device, the front surface of the base comes in contact with the axial end surface of the disk facing the axial direction, the end surface of the push rod on the front side faces the blade root, the first direction of the removal device coincides with the axial direction in which the axis extends, and the second direction of the removal device coincides with the inclination direction. Since the removal device is disposed in this way, the base is immovable in the first direction with respect to the disk or the rotor shaft. Next, the push rod is moved toward the front side by the rod-moving mechanism. The push rod is moved in the second direction that forms an acute angle with respect to the first direction by the rod guide. The second direction is the inclination direction in which the blade root groove extends. Accordingly, in the removal device, the push rod can press the turbine blade in the direction in which the blade root groove extends, and the turbine blade can be moved. For this reason, in the removal device, the turbine blade can be easily removed from the blade root groove without damaging the turbine blade.

Further, as a typical example of the base restrained immovably in the first direction, the base may have a front surface that is a surface perpendicular to the first direction.

In the removal device for a turbine blade, the base may have a frame on which the rod-moving mechanism is installed and to which the rod guide is attached, and a movement-restraining mechanism configured to restrain movement of the frame in the first direction.

In the removal device, since the movement-restraining mechanism is provided, movement of the base including the frame in the first direction can be restrained regardless of a size or a shape of the frame.

In the removal device for a turbine blade having the movement-restraining mechanism, the movement-restraining mechanism may have a pressing member having at least a portion that is disposed on the front side or a rear side opposite to the front side with respect to the frame.

In the removal device, as at least a portion of the pressing member is disposed on the front side or the rear with respect to the frame, movement of the base including the frame in the first direction can be restrained.

In the removal device for a turbine blade of any one of the above-mentioned aspects having the movement-restraining mechanism, the base may have a first movement-restraining mechanism that is the movement-restraining mechanism, and a second movement-restraining mechanism configured to restrain movement of the frame in a third direction perpendicular to the first direction and the second direction, and the second movement-restraining mechanism may have an arc surface that is a surface facing one side in the third direction, is disposed on the one side in the third direction with respect to the base and is formed in an arc shape about a virtual axis extending in the first direction.

When the turbine blade is removed by the removal device, the arc surface of the base comes in contact with the outer circumferential surface of the disk or the rotor shaft, and the radial direction with respect to the disk or the rotor shaft coincides with the third direction. In this way, as the removal device is disposed, the base movable toward one side in the third direction with respect to the disk or the rotor shaft.

In the removal device for a turbine blade having the pressing member, the movement-restraining mechanism may have a member separation mechanism configured to separate the pressing member from the frame in the first direction.

In the removal device, since the pressing member is moved in the first direction with respect to the frame by the member separation mechanism, movement of the base including the frame in the first direction can be easily restrained.

In the removal device for a turbine blade of any one of the above-mentioned aspects, the rod guide may have a guide hole passing therethrough in the second direction and with which the push rod is able to come in sliding contact. The rod guide may be detachably attached to the base. In this case, the rod guide may include a fixing tool fixed to the base.

In the removal device, movement of the push rod in each direction perpendicular to the second direction can be restrained.

The inclination direction with respect to the axis may vary according to the disk. For this reason, since the rod guide can be varied according to the disk when the rod guide is attachable to and detachable from the base, versatility of the removal device can be increased.

In the removal device for a turbine blade according to any one of the above-mentioned aspects, the rod-moving mechanism may have a taper-forming body having a tapered surface facing the front side, and the push rod may be moved toward the front side when the tapered surface of the taper-forming body moves while coming in contact with an end surface of the push rod on a rear side opposite to the front side.

In the removal device for a turbine blade according to any one of the above-mentioned aspects, the rod-moving mechanism may have a taper-forming body inclined with respect to a virtual surface perpendicular to the first direction and on which a tapered surface facing the front side is formed, and the taper-forming body may be formed on the base such that the tapered surface is relatively movable in a direction in which the virtual surface widens with respect to an end surface of the rear side while coming in contact with an end surface of the rear side of the push rod opposite to the front side.

In the removal device having the taper-forming body, the push rod can be moved toward the front side by moving the taper-forming body. Accordingly, in the removal device, the turbine blade can be moved without applying an impact load to the turbine blade.

In the removal device for a turbine blade having the taper-forming body, the rod-moving mechanism may have a rotation center shaft, the taper-forming body may be attached to the rotation center shaft to be rotatable about the rotation center shaft, and the tapered surface may extend in a circumferential direction with respect to the rotation center shaft.

In the removal device, since the tapered surface extends in the circumferential direction with respect to the rotation center shaft, the taper-forming body can be reduced in size in comparison with the case in which the tapered surface extends in a straight line.

In the removal device for a turbine blade having the rotation center shaft, the taper-forming body may have a rotating plate that rotates about the rotation center shaft, and a handle extending from an outer circumference of the rotating plate in a radial direction with respect to the rotation center shaft, and the tapered surface may be formed on the rotating plate.

In the removal device, the handle is operated and the taper-forming body is rotated. For this reason, in the removal device, a distance from the rotation center shaft serving as a supporting point to the handle serving as a force point is larger than a distance from the rotation center shaft serving as the supporting point to the tapered surface serving as a point of action. Accordingly, in the removal device, the taper-forming body can be rotated with a small force. In other words, in the removal device, the push rod can be moved toward the front side with a small force.

In the removal device for a turbine blade according to any one of the above-mentioned aspects, the rod-moving mechanism may have a male screw configured to come in contact with an end surface of the push rod on the rear side opposite to the front side, and a screw hole formed in the base, having a female screw with which the male screw is threadedly engaged and extending in the first direction.

In the removal device, when the male screw is screwed into the screw hole, the push rod can be moved toward the front side. Accordingly, in the removal device, the turbine blade can be moved without applying an impact load to the turbine blade.

In addition, in the removal device for a turbine blade according to any one of the above-mentioned aspects, the rod-moving mechanism may have an actuator configured to apply a force for moving the push rod toward the front side.

In the removal device, as the actuator is driven, the push rod can be moved.

In addition, in order to accomplish the above-mentioned purpose, a rotor set as an aspect of the present invention includes the removal device for a turbine blade according to any one of the above-mentioned aspects, a rotor shaft; and a plurality of turbine blades attached to an outer circumferential side of the rotor shaft, wherein the turbine blade has a blade body extending in a radial direction with respect to the rotor shaft and forming a blade profile, and a blade root formed inside the blade body in the radial direction, a blade root groove recessed from the outside in the radial direction toward the inside in the radial direction, extending in an inclination direction that forms an acute angle with respect to an axial direction in which the rotor shaft extends, and into which the blade root is inserted, is formed in the rotor shaft, and an angle formed by the second direction with respect to the first direction coincides with an angle formed by the inclination direction with respect to the axial direction.

In addition, in order to accomplish the above-mentioned purpose, a rotor set as another aspect according to the present invention includes the removal device for a turbine blade in which the rod guide has the guide hole; a rotor shaft; and a plurality of turbine blades attached to an outer circumferential side of the rotor shaft, wherein the turbine blade has a blade body extending in a radial direction with respect to the rotor shaft and forming a blade profile, and a blade root installed inside the blade body in the radial direction, a blade root groove recessed from the outside in the radial direction toward the inside in the radial direction, extending in an inclination direction that forms an acute angle with respect to an axial direction in which the rotor shaft extends, and into which the blade root is inserted, is formed in the rotor shaft, an angle formed by the second direction with respect to the first direction coincides with an angle formed by the inclination direction with respect to the axial direction, the removal device has a second rod guide in addition to a first rod guide that is the rod guide, and the second rod guide has a second guide hole having a different shape from that of the guide hole of the first rod guide. Further, the different shape of the guide hole includes both of a cross-sectional shape different from a passing-through direction of the guide hole and a second direction that is the passing-through direction of the guide hole different from the first direction.

The inclination direction with respect to the axis may vary according to the disk. In addition, the end surface shape of the blade root is also varied by the disk. In the rotor set, since the rod guide can be modified according to the disk, versatility of the removal device can be increased.

In order to accomplish the above-mentioned purpose, a method of removing a turbine blade as an aspect of the present invention is a method of removing a turbine blade attached to an outer circumferential side of a rotor shaft, the turbine blade having a blade body extending in a radial direction with respect to the rotor shaft and forming a blade profile, and a blade root installed inside the blade body in the radial direction, and a blade root groove recessed from the outside in the radial direction toward the inside in the radial direction, extending in an inclination direction that forms an acute angle with respect to an axial direction in which the rotor shaft extends, and into which the blade root is inserted, being formed in the rotor shaft, the method performing: a preparation process of preparing a removal device comprising a base that is restrained immovably in a first direction, a push rod that is able to protrude from a front surface of the base facing a front side that is one side in the first direction toward the front side, a rod-moving mechanism installed on the base and configured to move the push rod toward the front side, and a rod guide attached to the base and configured to guide movement of the push rod by the rod-moving mechanism in a second direction that form an acute angle with respect to the first direction; a disposition process of disposing the base of the removal device such that the first direction coincides with the axial direction and the second direction coincides with the inclination direction when an end surface of the push rod on the front side faces the blade root while bringing the front surface of the base in contact with an axial end surface of the rotor shaft in the axial direction; and a rod-moving process of moving the push rod toward the front side using the rod-moving mechanism.

In the method of removing a turbine blade, the preparation process may include a rod guide preparation process of preparing a plurality of rod guides having guide holes passing therethrough in the second direction and having different shapes, and push rods corresponding to the plurality of rod guides; a selection process of selecting the rod guide having a guide hole corresponding to a shape of the blade root from the plurality of rod guides and selecting the push rod corresponding to the selected rod guide; and a rod guide attachment process of attaching the rod guide selected in the selection process to the base and causing the push rod selected in the selection process to follow the rod guide.

In the method of removing a turbine blade according to any one of the above-mentioned aspects, the base in the removal device prepared in the preparation process may have a frame on which the rod-moving mechanism is installed and to which the rod guide is attached, and a pressing member having at least a portion disposed on the front side or the rear side opposite to the front with respect to the frame, and in the disposition process, the pressing member may be disposed on the front side or the rear side of the frame, and the pressing member may come in contact with an axial end surface of the rotor shaft in the axial direction.

In addition, in the method of removing a turbine blade according to any one of the above-mentioned aspects, the base in the removal device prepared in the preparation process may have a frame on which the rod-moving mechanism is installed and to which the rod guide is attached, a pressing member having at least a portion disposed on the front side or the rear side opposite to the front with respect to the frame, and a member separation mechanism configured to separate the pressing member in the first direction with respect to the frame, and in the disposition process, the pressing member may be moved in the first direction by the member separation mechanism, and the front surface of the base may come in contact with the axial end surface of the rotor shaft facing the axial direction.

In the method of removing a turbine blade according to any one of the above-mentioned aspects, the rod-moving mechanism of the removal device prepared in the preparation process may have a taper-forming body in which a tapered surface facing the front side is formed, and in the rod-moving process, the push rod may be moved toward the front side by moving the tapered surface of the taper-forming body to an end surface of the push rod on the rear side opposite to the front side while coming in contact with the end surface.

In this case, the rod-moving mechanism of the removal device prepared in the preparation process may have a rotation center shaft, the taper-forming body may be attached to the rotation center shaft that is rotatable about the rotation center shaft and the tapered surface may extend in a circumferential direction with respect to the rotation center shaft, and in the rod-moving process, the taper-forming body may be rotated about the rotation center shaft.

Further, in the method of removing a turbine blade according to any one of the above-mentioned aspects, the rod-moving mechanism of the removal device prepared in the preparation process may have a screw hole formed in the base and in which a female screw is formed, and a male screw that is able to be threadedly engaged with the female screw of the screw hole, and in the rod-moving process, the male screw may be rotated and the push rod may be moved toward the front side.

Advantageous Effects of Invention

According to an aspect of the present invention, it is possible to easily remove a turbine blade from a blade root groove without damaging the turbine blade.

BRIEF DESCRIPTION OF DRAWINGS

FIG. 8(A) is a front view of the taper-forming body, and FIG. 8(B) is a view taken along an arrow B in FIG. 8(A).

DESCRIPTION OF EMBODIMENTS

Hereinafter, an embodiment of the present invention and variants thereof will be described in detail with reference to the accompanying drawings.

[Embodiment of Rotary Machine]

An embodiment of a rotary machine will be described with reference to FIGS. 1 to 4.

Figure 1:
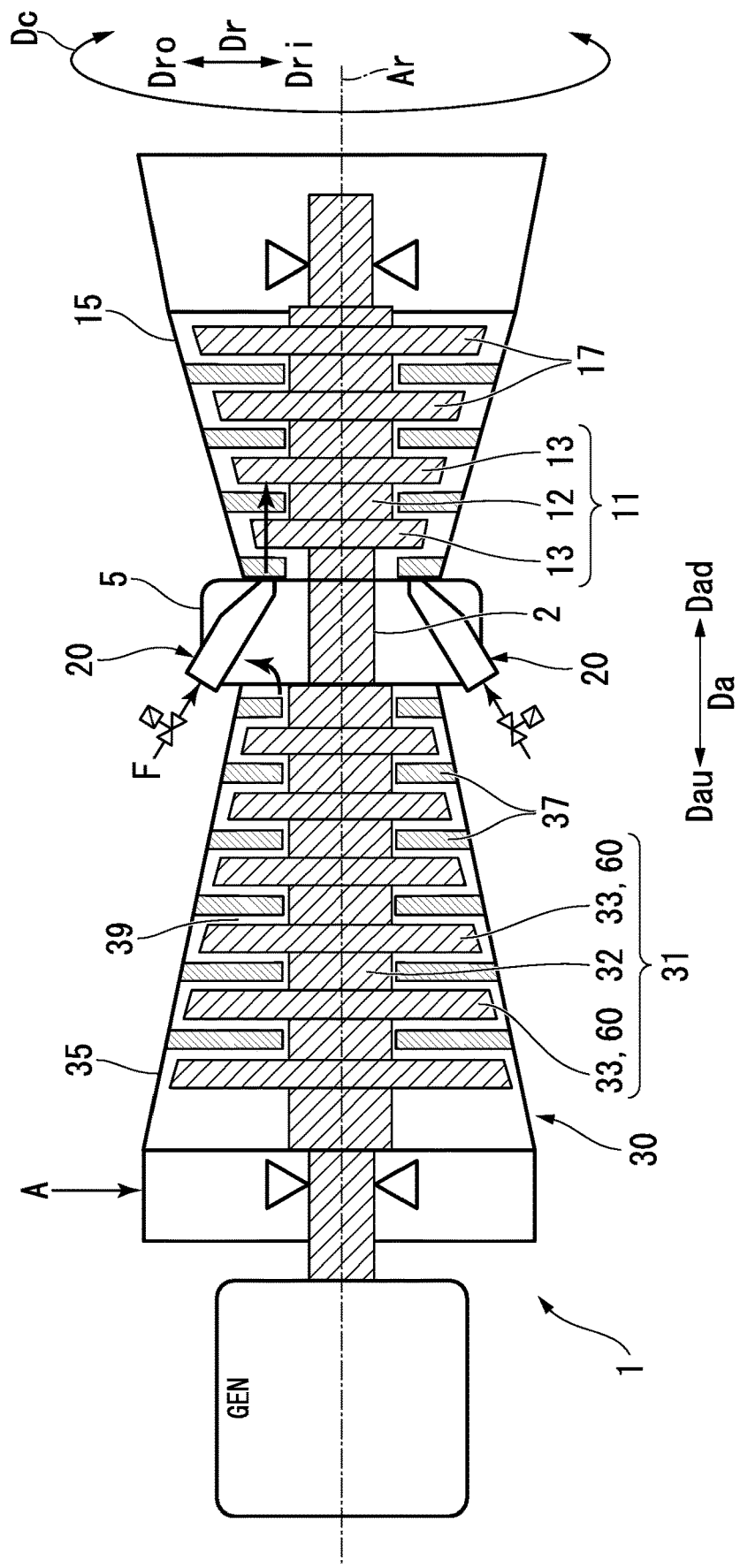
FIG. 1 is a schematic cross-sectional view of a gas turbine according to an embodiment of the present invention.

The rotary machine of the embodiment is a compressor of a gas turbine. As shown in FIG. 1, a gas turbine 1 includes a compressor 30 configured to compress air A, a combustor 20 configured to combust fuel F in the air A compressed by the compressor 30 to generate a combustion gas G, and a turbine 10 driven by the combustion gas G.

The compressor 30 has a compressor rotor 31 that is rotated about an axis Ar, a compressor casing 35 configured to cover the compressor rotor 31, and a plurality of turbine vane rows 37. The turbine 10 has a turbine rotor 11 that is rotated about the axis Ar, a turbine casing 15 configured to cover the turbine rotor 11, and a plurality of turbine vane rows 17.

The compressor rotor 31 and the turbine rotor 11 are disposed on the same axis Ar and connected to each other to form a gas turbine rotor 2. For example, a rotor of a generator GEN is connected to the gas turbine rotor 2. In addition, the compressor casing 35 and the turbine casing 15 are connected to each other to form a gas turbine casing 5. Further, hereinbelow, a direction in which the axis Ar extends is referred to as an axial direction Da, a circumferential direction about the axis Ar is simply referred to as a circumferential direction Dc, and a direction perpendicular to the axis Ar is referred to as a radial direction Dr. In addition, the compressor 30 side with reference to the turbine 10 in the axial direction Da is referred to as an upstream side Dau, and an opposite side thereto is referred to as a downstream side Dad. In addition, a side near the axis Ar in the radial direction Dr is referred to as an inner side Dri in the radial direction, and an opposite side thereto is referred to as an outer side Dro in the radial direction.

The turbine rotor 11 has a rotor shaft 12 extending in the axial direction Da about the axis Ar, and a plurality of turbine blade rows 13 attached to the rotor shaft 12. The plurality of turbine blade rows 13 are arranged in the axial direction Da. Each of the turbine blade rows 13 is constituted by a plurality of turbine blades arranged in the circumferential direction Dc. The turbine vane row 17 is disposed at the upstream side Dau of each of the plurality of turbine blade rows 13. The turbine vane rows 17 are installed inside the turbine casing 15. Each of the turbine vane rows 17 is constituted by a plurality of turbine vanes arranged in the circumferential direction Dc.

The compressor rotor 31 has a rotor shaft 32 extending in the axial direction Da about the axis Ar, and a plurality of turbine blade rows 33 attached to the rotor shaft 32. The plurality of turbine blade rows 33 are arranged in the axial direction Da. Each of the turbine blade rows 33 is constituted by a plurality of turbine blades 60 arranged in the circumferential direction Dc. The turbine vane rows 37 are disposed at the downstream side Dad of the plurality of turbine blade rows 33. The turbine vane rows 37 are installed inside the compressor casing 35. Each of the turbine vane rows 37 is constituted by a plurality of turbine vanes arranged in the circumferential direction Dc. An annular space between an outer circumferential side of the rotor shaft 32 and an inner circumferential side of the compressor casing 35 forms an air compression flow path 39 through which air is compressed while flowing.

Figure 2:
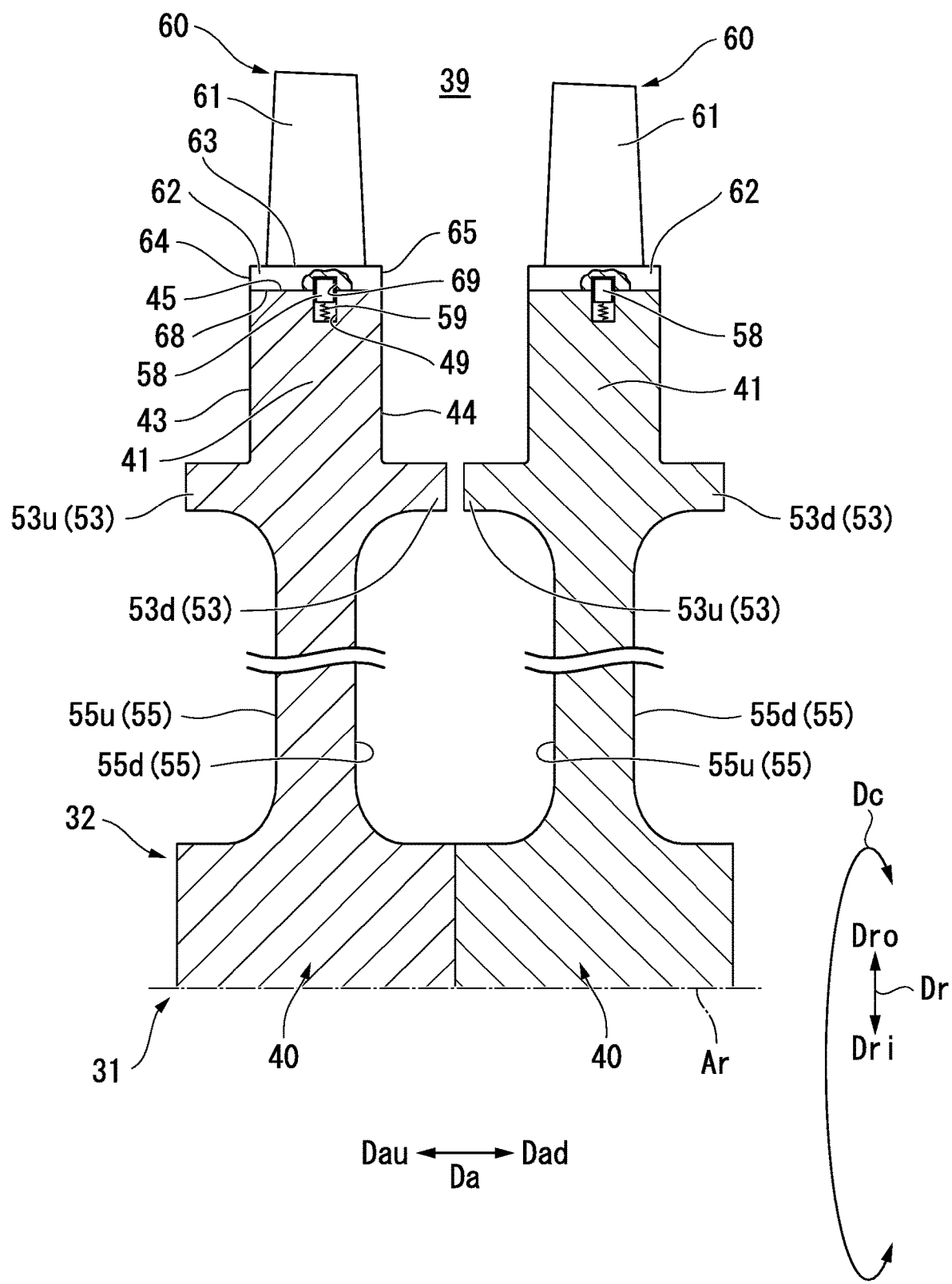
FIG. 2 is a cross-sectional view of a major part of a compressor rotor in the embodiment according to the present invention.

As shown in FIG. 2, the rotor shaft 32 of the compressor 30 has disks 40 of the plurality of turbine blade rows 33. Each of the plurality of disks 40 is formed in a disk shape about the axis Ar. The rotor shaft 32 is configured by stacking a plurality of disks 40 in the axial direction Da. The turbine blades 60 have blade bodies 61 that form a blade profile extending in the radial direction with respect to the axis Ar, and blade roots 62 installed at the inner side Dri in the radial direction of the blade bodies 61.

Turbine blade attachment sections 41, arms 53 and concave sections 55 are formed in the disks 40 having circular plate shapes. The turbine blade attachment sections 41 form portions of the disks 40 on the outer side Dro in the radial direction. The arms 53 have upstream-side arms 53u protruding from positions of the turbine blade attachment sections 41 on the inner side Dri in the radial direction and the turbine blade attachment sections 41 on the upstream side Dau toward the upstream side Dau, and downstream-side arms 53d protruding from positions of the turbine blade attachment sections 41 on the inner side Dri in the radial direction and the turbine blade attachment sections 41 on the downstream side Dad toward the downstream side Dad. All of the upstream-side arms 53u and the downstream-side arms 53d extend in the circumferential direction Dc and form an annular shape about the axis Ar. The concave sections 55 have upstream-side concave sections 55u that are relatively recessed toward the downstream side Dad with respect to the upstream-side arms 53u on the inner side Dri in the radial direction of the upstream-side arms 53u, and downstream-side concave sections 55d that are relatively recessed toward the upstream side Dau with respect to the downstream-side arms 53d on the inner side Dri in the radial direction of the downstream-side arms 53d. All of the upstream-side concave sections 55u and the downstream-side concave sections 55d extend in the circumferential direction Dc and form an annular shape about the axis Ar.

A plurality of blade root grooves 45 recessed from the outer side Dro in the radial direction toward the inner side Dri in the radial direction and extending in a direction including a component in the axial direction Da are formed in the turbine blade attachment sections 41. The blade roots 62 of the turbine blades 60 enter the blade root grooves 45. Further, columnar pin holes 49 recessed from groove bottom surfaces 48 of the blade root grooves 45 toward the inner side Dri in the radial direction are formed in the turbine blade attachment sections 41. Columnar pins 58 and springs 59 configured to bias the pins 58 in a direction in which the pins protrude from the pin holes 49 are disposed in the pin holes 49. Pin holes 69 recessed from the inner side Dri in the radial direction toward the outer side Dro in the radial direction are formed in the blade roots 62 of the turbine blades 60. The pins 58 protruding from the pin holes 49 of the disks 40 enter the pin holes 69.

Figure 3:
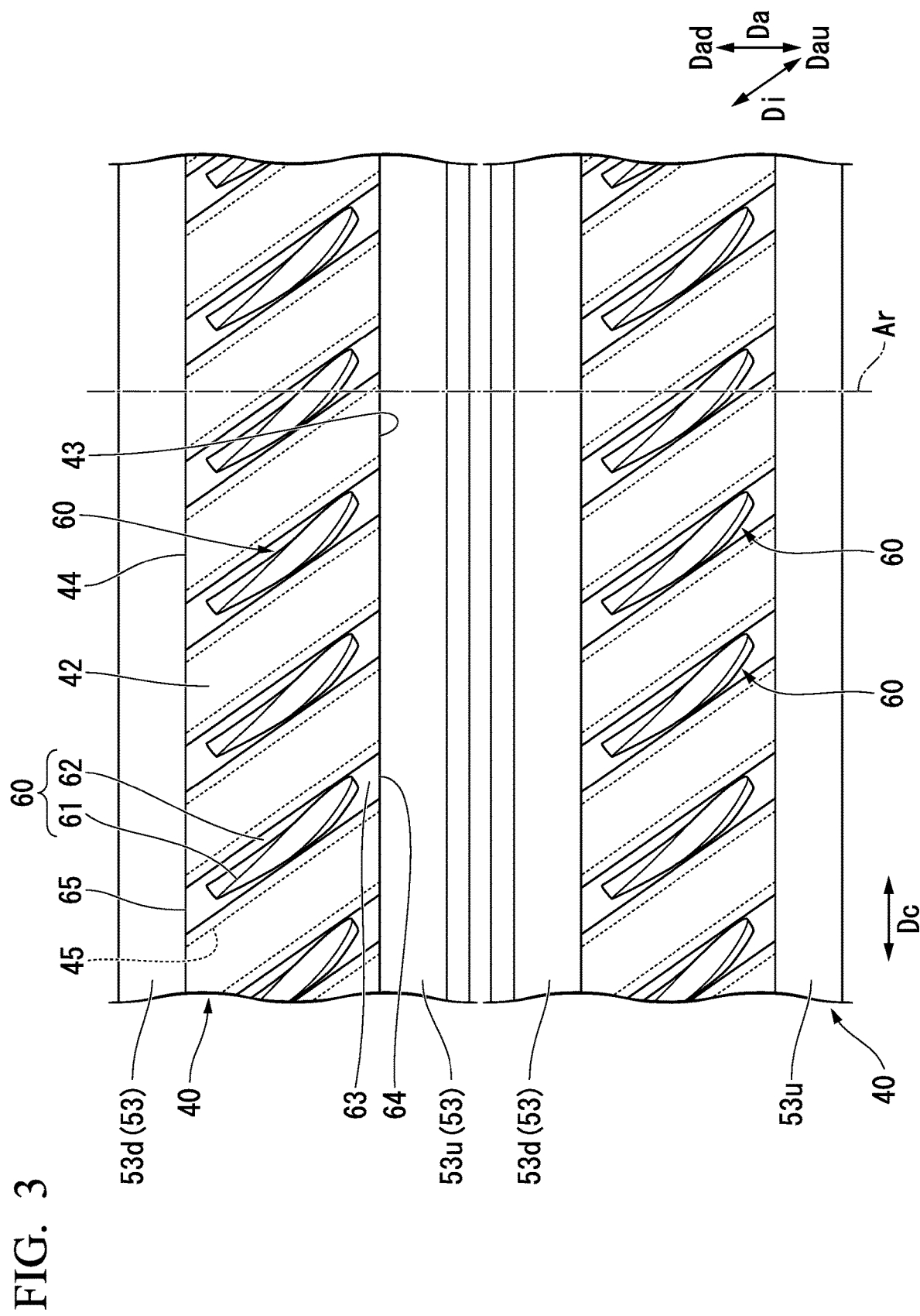
FIG. 3 is a plan view of the major part of the compressor rotor in the embodiment according to the present invention when seen from an outer side in a radial direction.
Figure 4:
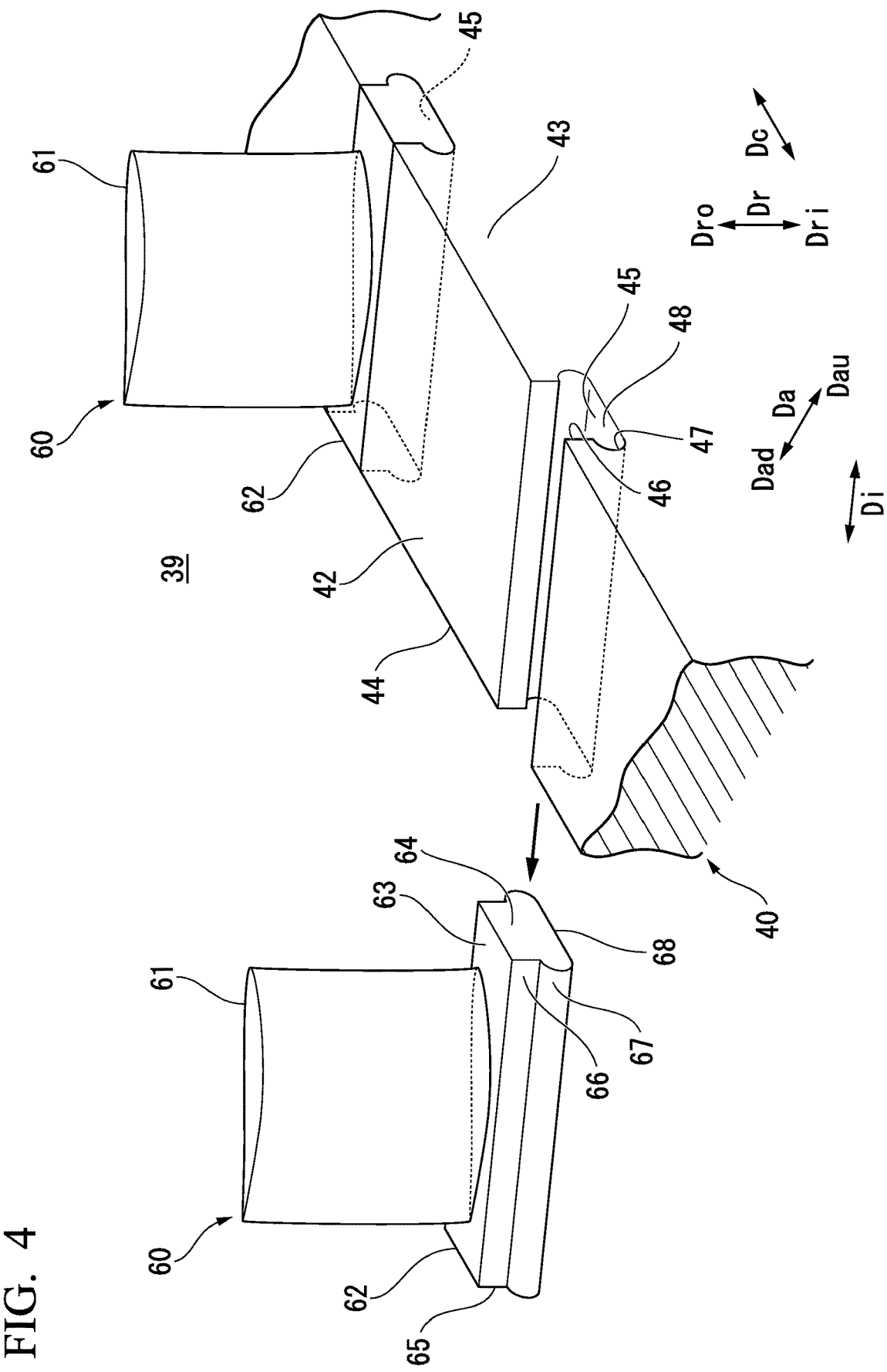
FIG. 4 is a perspective view of the major part of the compressor rotor in the embodiment according to the present invention.

As shown in FIGS. 3 and 4, gas path surfaces 42 facing the outer side Dro in the radial direction, front end surfaces 43 facing the upstream side Dau and rear end surfaces 44 facing the downstream side Dad are formed on the turbine blade attachment sections 41 of the disks 40. The gas path surfaces 42 define a portion of an edge of the air compression flow path 39 having an annular shape on the inner side Dri in the radial direction. The front end surfaces 43 and the rear end surfaces 44 are surfaces substantially perpendicular to the axis Ar. The plurality of blade root grooves 45 are recessed from the gas path surfaces 42 toward the inner side Dri in the radial direction at intervals in the circumferential direction Dc. The blade root grooves 45 extend from the rear end surfaces 44 to the front end surfaces 43 of the disks 40 in an inclination direction Di with respect to the axis Ar. The inclination direction Di is a direction that forms an acute angle with respect to the axial direction Da. The blade root grooves 45 have first groove sections 46 having a groove width in the circumferential direction Dc that is a first groove width, and second groove sections 47 having a groove width in the circumferential direction Dc that is a second groove width larger than the first groove width. The second groove sections 47 are disposed in the first groove sections 46 on the inner side Dri in the radial direction and connected to the first groove sections 46.

Gas path surfaces 63 facing the outer side Dro in the radial direction, bottom surfaces 68 facing the inner side Dri in the radial direction, front end surfaces 64 facing the upstream side Dau and rear end surfaces 65 facing the downstream side Dad are formed on the blade roots 62 of the turbine blades 60. The gas path surfaces 63 define a portion of an edge of the air compression flow path 39 having an annular shape on the inner side Dri in the radial direction. The blade bodies 61 of the turbine blades 60 extend from the gas path surfaces 63 to the outer side Dro in the radial direction. The blade roots 62 have first blade root sections 66 having a width in the circumferential direction Dc that is a first blade root width, and second blade root sections 67 having a width in the circumferential direction Dc that is a second blade root width larger than the first blade root width. The second blade root sections 67 are disposed on the inner side Dri in the radial direction of the first blade root sections 66 and connected to the first blade root sections 66. The gas path surfaces 63 of the blade roots 62 are formed on the first blade root sections 66. The first blade root width dimension is slightly smaller than the first groove width dimension that is mentioned above and substantially the same as the first groove width dimension. The second blade root width dimension is slightly smaller than the second groove width dimension that is mentioned above and substantially the same as the second groove width dimension. For this reason, in a state in which the blade roots 62 have entered the blade root grooves 45, the blade roots 62 cannot be removed from the blade root grooves 45 even when a centrifugal force is applied to the turbine blades 60. In this state, when the compressor 30 is operated for a long time, the blade roots 62 are fixed to the blade root grooves 45. The bottom surfaces 68 of the blade roots 62 are formed on the second blade root sections 67. All of the front end surfaces 64 and the rear end surfaces 65 of the blade roots 62 are formed on the first blade root sections 66 and the second blade root sections 67. The pin holes 69 of the turbine blades 60 are recessed from the bottom surfaces 68 of the turbine blades 60 toward the outer side Dro in the radial direction. The pins 58 entering the pin holes 69 play a role of restraining movement of the turbine blades 60 in the inclination direction Di in which the blade root grooves 45 extend.

In a state in which the blade roots 62 of the turbine blades 60 have entered the blade root grooves 45 of the disks 40, the front end surfaces 64 of the blade roots 62 are substantially flush with the front end surfaces 43 of the disks 40. Further, the rear end surfaces 65 of the blade roots 62 are substantially flush with the rear end surfaces 44 of the disks 40. For this reason, in this state, the front end surfaces 64 and the rear end surfaces 65 of the blade roots 62 are surfaces substantially perpendicular to the axis Ar.

[Embodiment of Removal Device]

An embodiment of the removal device will be described with reference to FIGS. 5 to 12.

Figure 5:
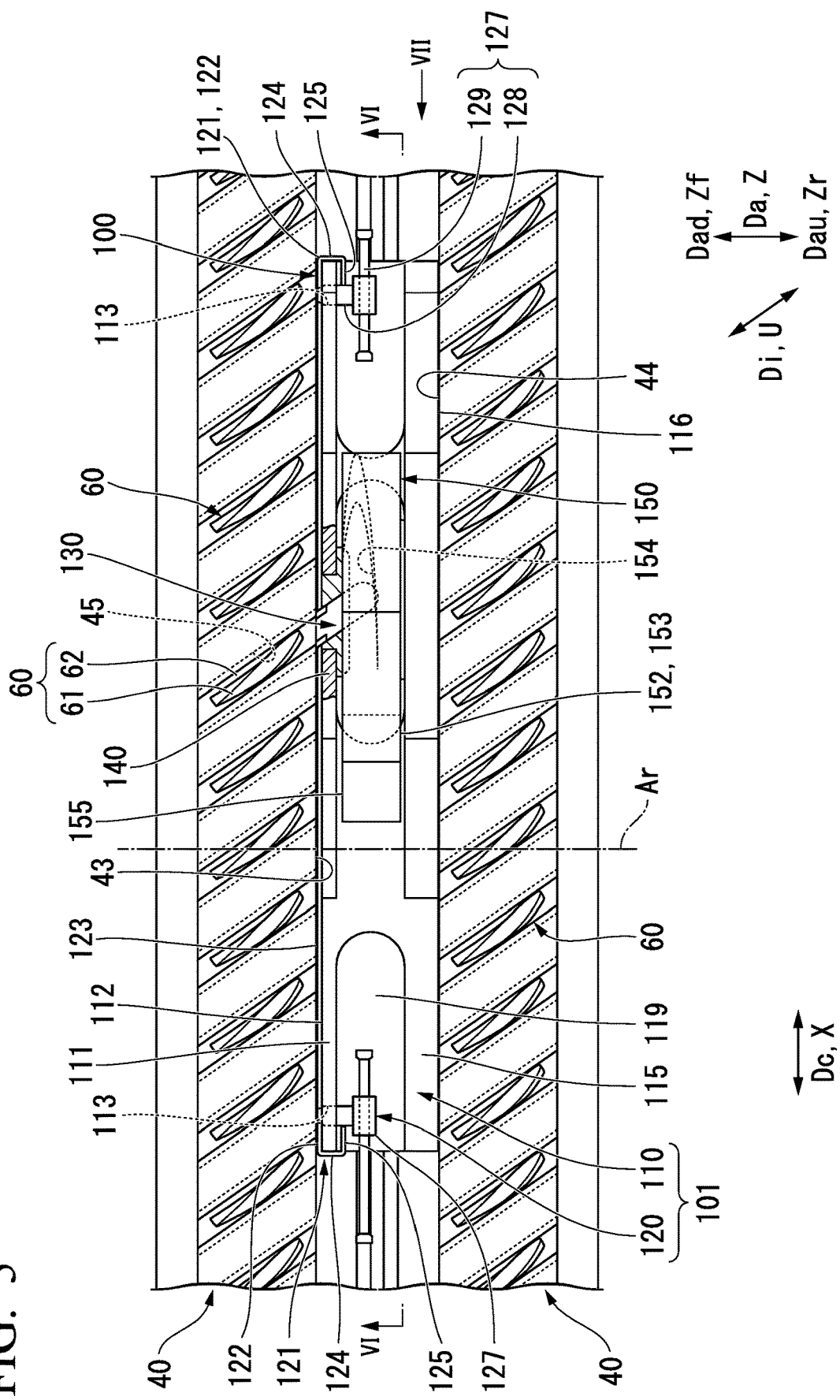
FIG. 5 is a plan view of a first removal device in the embodiment according to the present invention.
Figure 6:
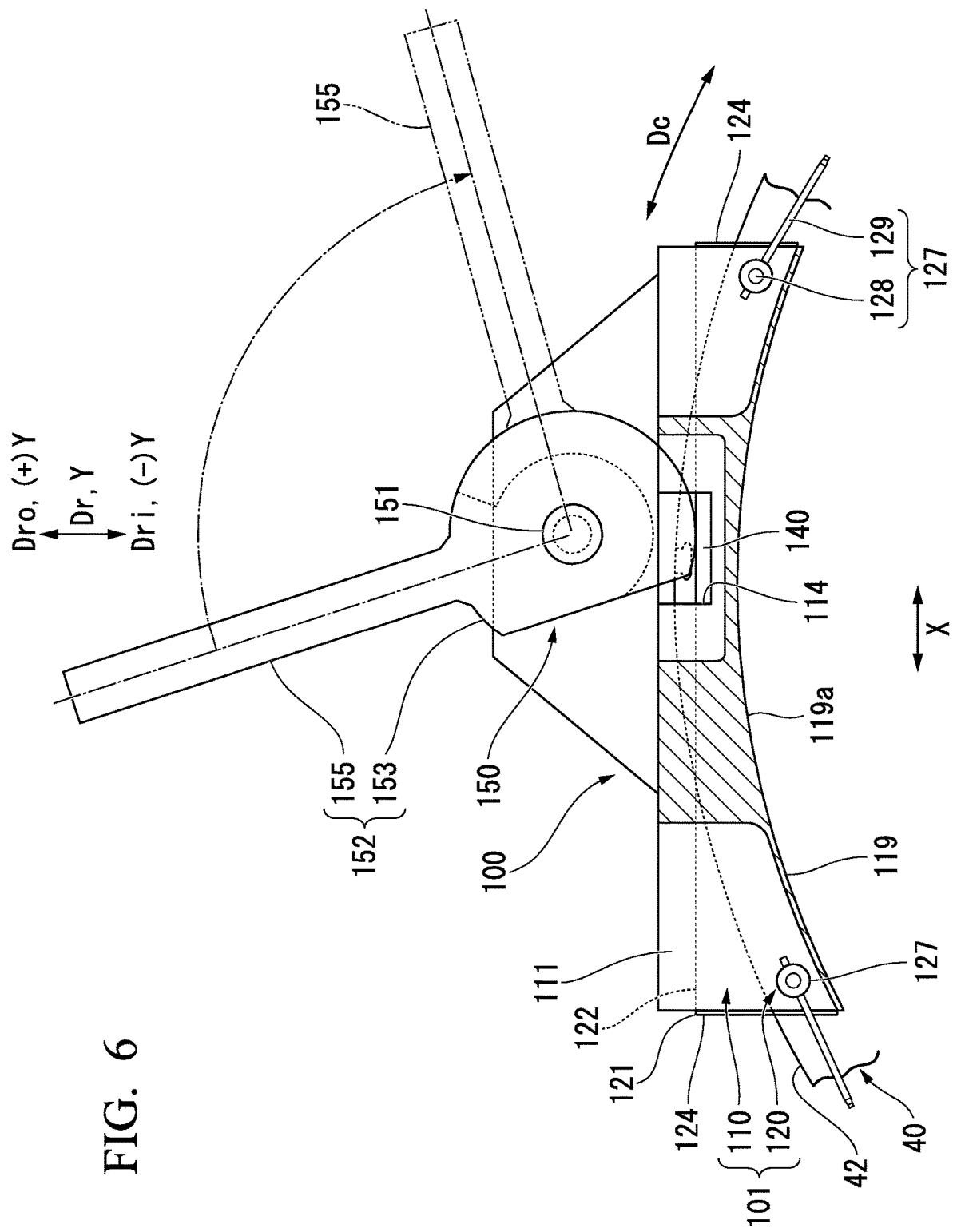
FIG. 6 is a cross-sectional view taken along line VI-VI in FIG. 5.
Figure 7:
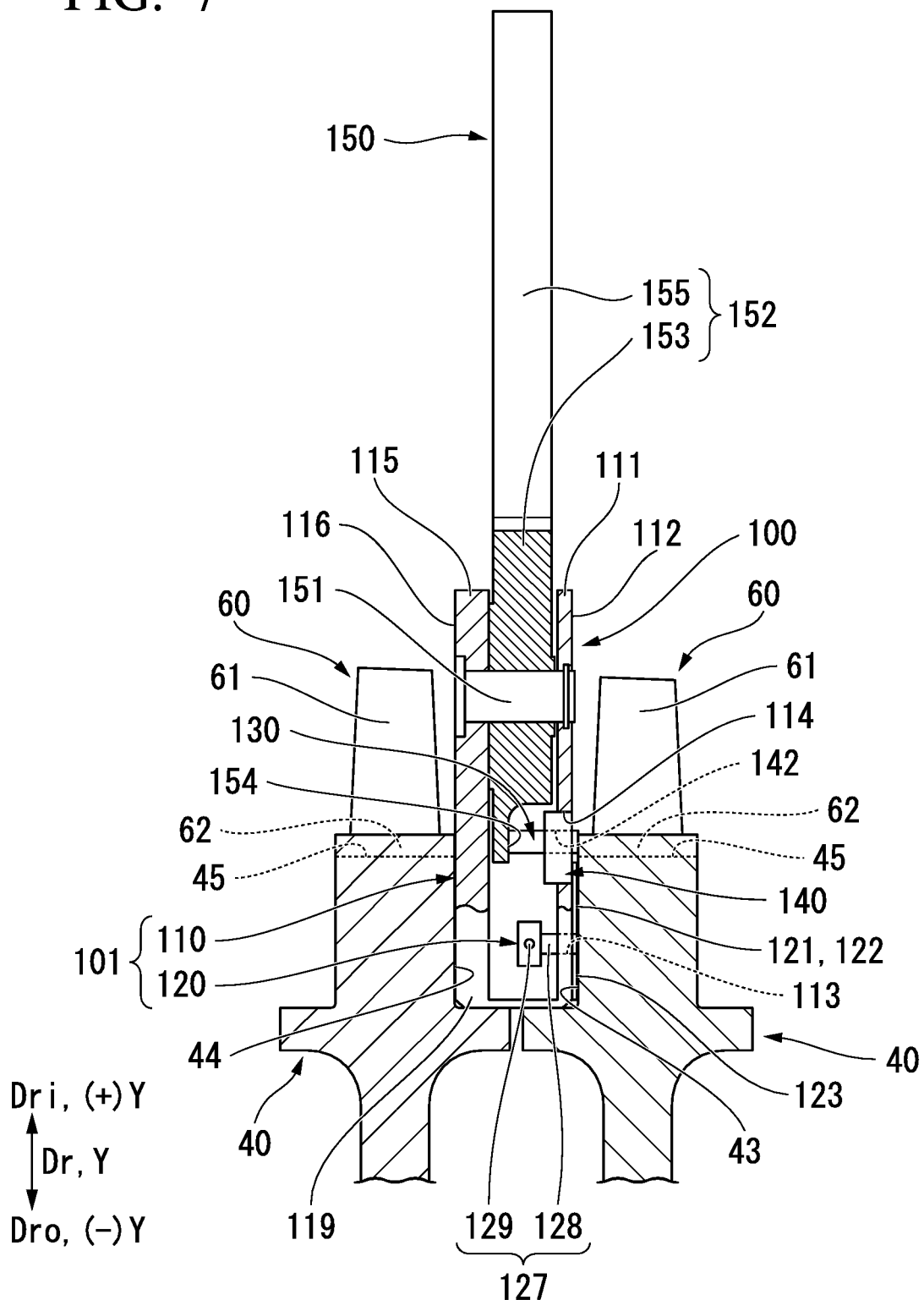
FIG. 7 is a view taken along an arrow VII in FIG. 5.

The removal device of the embodiment is an apparatus for removing the turbine blades 60 from the blade root grooves 45 of the disks 40 described above. As shown in FIGS. 5 to 7, a removal device 100 of the embodiment has a base 101 immovably restrained in a Z direction that is a first direction, a push rod 130 protruding from the base 101 toward a front side Zf that is one side in the Z direction, a rod-moving mechanism 150 configured to move the push rod 130 toward the front side Zf, and a rod guide 140 configured to guide a moving direction of the push rod 130. Further, as described below, the other side in the Z direction, i.e., an opposite side to the front side Zf is a rear side Zr. In addition, a direction perpendicular to the Z direction and an X direction is referred to as a Y direction, and a direction perpendicular to the Z direction and the Y direction is referred to as the X direction.

The base 101 has a frame 110 on which the rod-moving mechanism 150 is installed and to which the rod guide 140 is attached, and a movement-restraining mechanism 120 configured to restrain movement of the frame 110 in the Z direction. The frame 110 has a front wall plate 111 and a rear wall plate 115 that extend in a direction perpendicular to the Z direction, and a connecting section 119 configured to connect the front wall plate 111 and the rear wall plate 115. The rear wall plate 115 is disposed on the rear side Zr at an interval from the front wall plate 111. The connecting section 119 connects an edge of the front wall plate 111 on the (−) Y side and an edge of the rear wall plate 115 on the (−) Y side. A surface of the connecting section 119 facing the (−) Y side is an arc surface 119a having an arc shape about a virtual axis disposed on the (−) Y with respect to the connecting section 119 and extending in the Z direction. A surface of the front wall plate 111 facing the front side Zf forms a front surface 112 of the frame 110. In addition, a surface of the rear wall plate 115 facing the rear side Zr forms a rear surface of the base 101 while forming a rear surface 116 of the frame 110. The front surface 112 and the rear surface 116 of the frame 110 are surfaces parallel to each other and perpendicular to the Z direction.

The movement-restraining mechanism 120 has a pressing member 121 having a portion disposed on the front side Zf than the front surface 112 of the frame 110, and a member separation mechanism 127 configured to separate the pressing member 121 from the frame 110 toward the front side Zf.

As shown in FIG. 5, the pressing member 121 has a main plate disposed on the front side Zf than the front surface 112 of the frame 110, side plates 124 extending from an end of the main plate 122 on the (±) X side toward the rear side Zr, and removal prevention plates 125 extending from ends of the side plates 124 on the rear side Zr in the X direction. The main plate 122 is disposed parallel to the front surface 112 of the frame 110. A width of the main plate 122 in the X direction is substantially equal to a width of the frame 110 in the X direction. A removal prevention plate 125 on the (+) X side extends from an end of the rear side Zr of the side plate 124 on the (+) X toward the (−) X side. The removal prevention plate 125 on the (−) X side extends from an end of the rear side Zr of the side plate 124 on the (−) X side toward the (+) X side. Each of the removal prevention plates 125 faces a surface of the front wall plate 111 facing the rear side Zr in the Z direction. An interval dimension in the Z direction between the main plate 122 and each of the removal prevention plates 125 is larger than a width dimension of the front wall plate 111 in the Z direction, in other words, a thickness dimension of the front wall plate 111. For this reason, the pressing member 121 is movable with respect to the front wall plate 111 in the Z direction and a moving range thereof is limited.

The member separation mechanism 127 has a separation bolt 128, and an operation rod 129 configured to rotate the separation bolt 128. A screw hole 113 passing through in the Z direction is formed through the front wall plate 111. A male screw section of the separation bolt 128 is screwed into the screw hole 113. The operation rod 129 is attached to a bolt head section of the separation bolt 128. A tip of the separation bolt 128 comes in contact with the main plate 122 of the pressing member 121. When the separation bolt 128 is screwed into the screw hole 113 of the front wall plate 111, the pressing member 121 is pressed against the front side Zf by the separation bolt 128, and the main plate 122 of the pressing member 121 is separated from the frame 110 toward the front side Zf. A surface of the main plate 122 facing the front side Zf forms a front surface 123 of the base 101.

Figure 10:
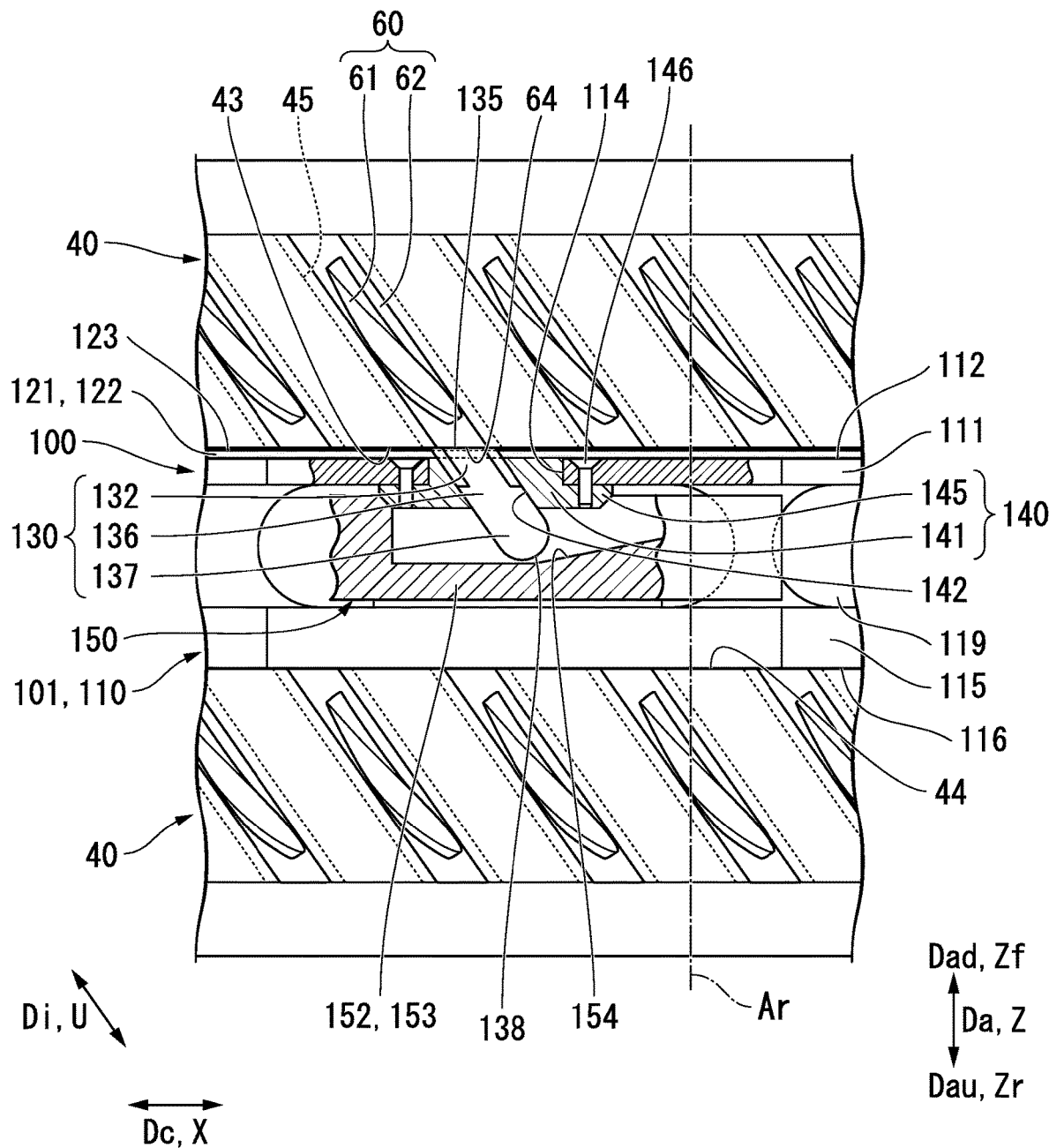
FIG. 10 is a plan view of major parts of the disk, the turbine blade and the removal device after a disposition process in the embodiment according to the present invention.

As shown in FIG. 10, the rod guide 140 has a main body section 141, and a flange section 145 overhanging from an outer circumference of the main body section 141 toward an outer circumferential side. A guide-mounting hole 114 into which the main body section 141 of the rod guide 140 is inserted is formed in the front wall plate 111 of the frame 110. The main body section 141 of the rod guide 140 is inserted into the guide-mounting hole 114. The flange section 145 of the rod guide 140 is fixed to the front wall plate 111 of the frame 110 by a screw 146 serving as a fixing tool.

A guide hole 142 passing in a U direction (a second direction) that forms an acute angle with respect to the Z direction (a first direction) is formed in the main body section 141 of the rod guide 140.

Figure 9:
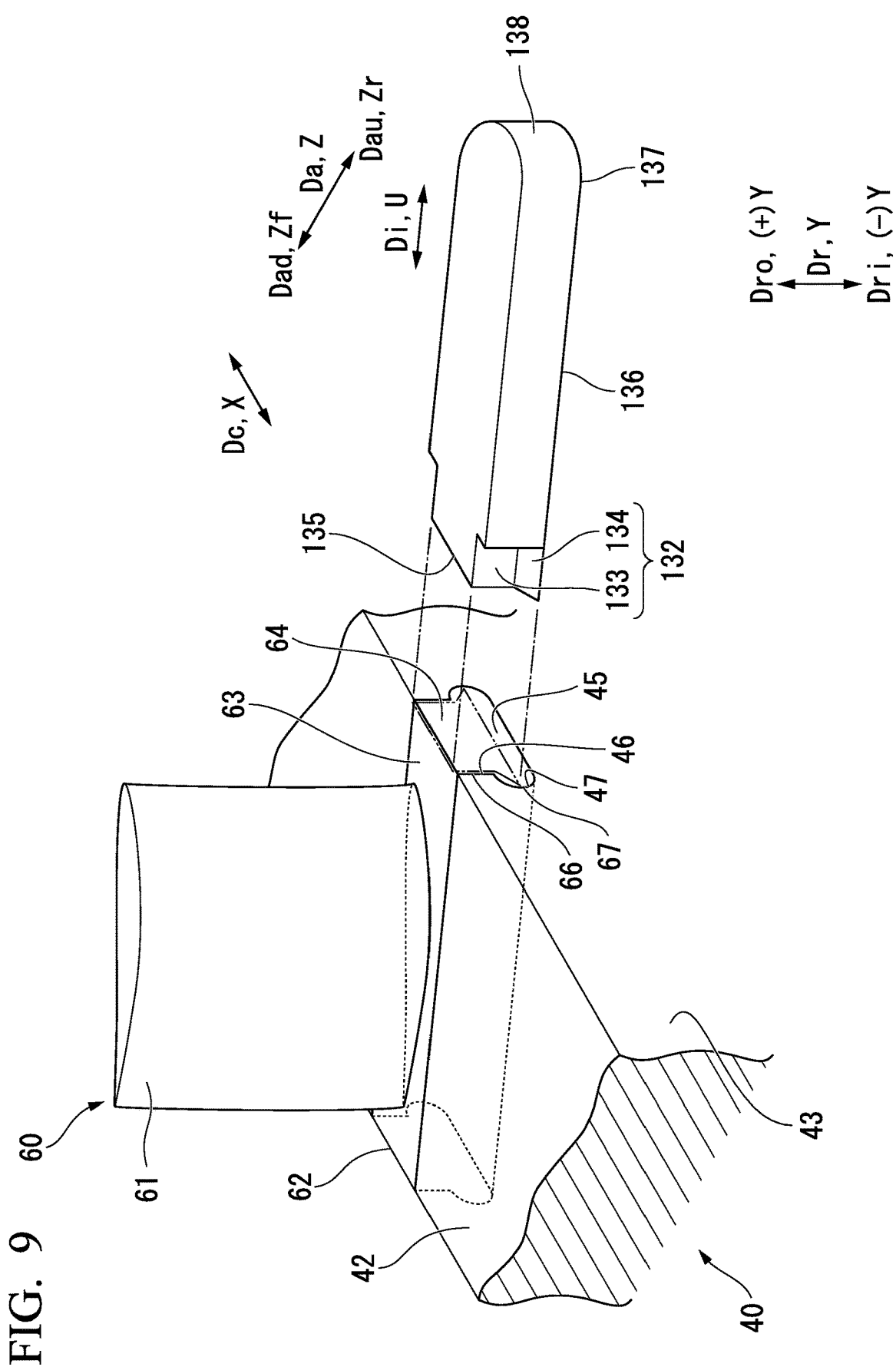
FIG. 9 is a perspective view of a disk, a turbine blade and a push rod in the embodiment according to the present invention.

As shown in FIGS. 9 and 10, the push rod 130 has a groove insertion section 132, a shell section 136 and a transition section 137. The push rod 130 forms a bar shape. A first end side of the push rod 130 forms the groove insertion section 132. A second end side of the push rod 130 opposite to the first end side forms the transition section 137. A space between the groove insertion section 132 and the transition section 137 forms the shell section 136. The shell section 136 is inserted into the guide hole 142 of the rod guide 140. The outer circumferential surface of the shell section 136 comes in contact with the inner circumferential surface of the guide hole 142. A cross-sectional shape of a surface of the groove insertion section 132 perpendicular to the Z direction corresponds to across-sectional shape perpendicular to the axial direction Da of the blade roots 62. Accordingly, the groove insertion section 132 has a first groove insertion section 133 having a width in the X direction perpendicular to the Z direction that is a first width, and a second groove insertion section 134 having a width in the X direction that is a second width larger than the first width. The second groove insertion section 134 is disposed on the (−) Y side of the first groove insertion section 133. The first width is slightly smaller than the above-mentioned first blade root width. The second width is slightly smaller than the above-mentioned second blade root width. A surface of the groove insertion section 132 facing the first end side forms a pressing surface 135 in contact with an end surface of the blade root 62. The pressing surface 135 is a surface perpendicular to the Z direction and parallel to the front surface 123 of the base 101. A cross-sectional shape of the transition section 137 perpendicular to the Y direction forms a semi-circular convex shape on the rear side Zr. Accordingly, a rear end surface 138 of the push rod 130 forms an arc shape.

Figure 8:
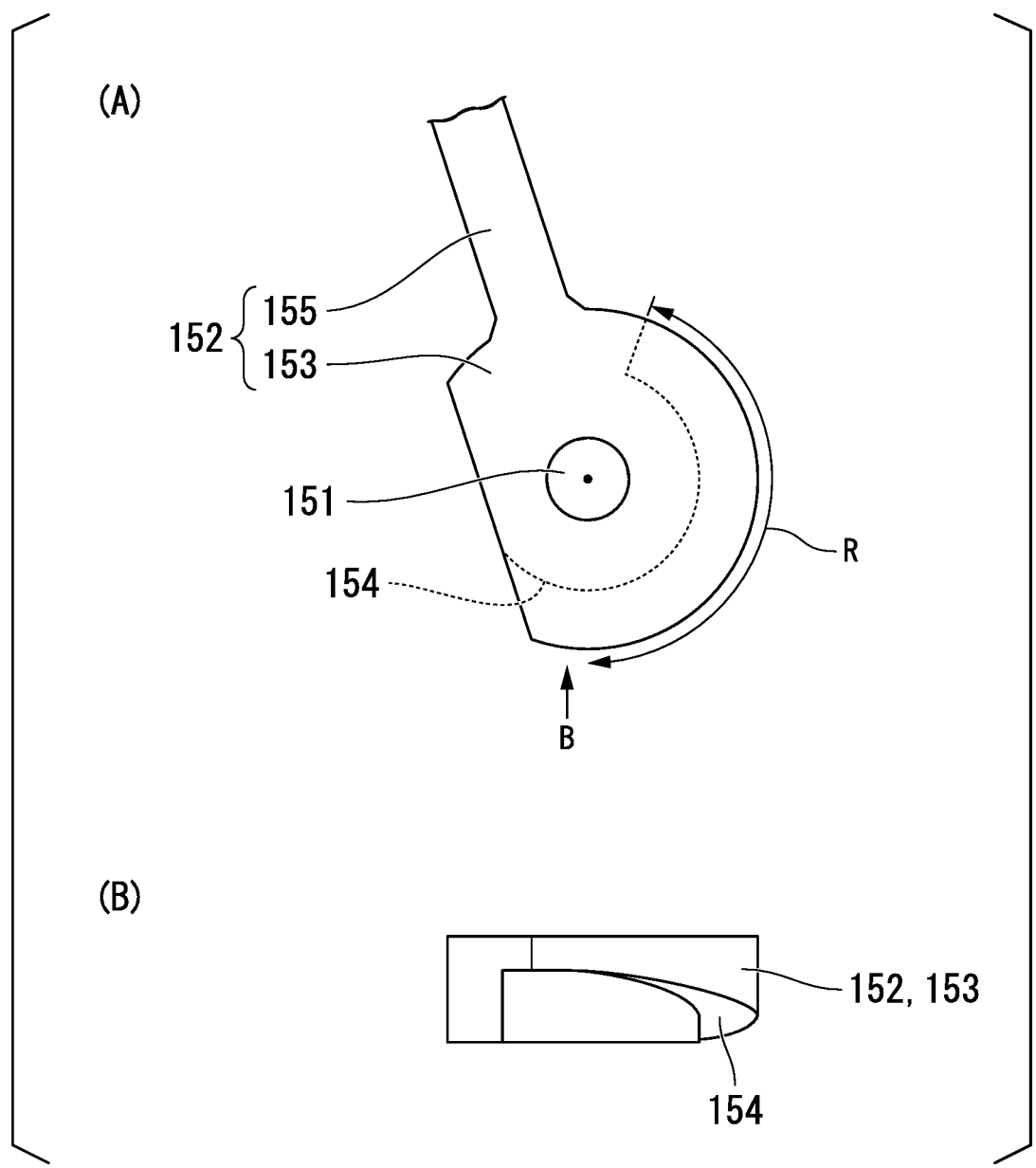
FIG. 8 is a view showing a taper-forming body in the embodiment according to the present invention.

As shown in FIGS. 5 to 8, the rod-moving mechanism 150 has a rotation center shaft 151 extending in the Z direction, and a taper-forming body 152 rotated about the rotation center shaft 151. A first end of the rotation center shaft 151 is supported by the front wall plate 111 of the frame 110, and a second end of the rotation center shaft 151 is supported by the rear wall plate 115 of the frame 110. The taper-forming body 152 has a rotating plate 153, and a handle 155 installed on an outer circumference of the rotating plate 153. The rotating plate 153 forms an arc shape obtained by cutting out a portion of a disk about the rotation center shaft 151. The rotating plate 153 is installed rotatably about the rotation center shaft 151. A tapered surface 154 inclined on a surface perpendicular to the Z direction and facing the front side Zf is formed on the rotating plate 153. As shown in FIGS. 8 and 10, the tapered surface 154 is formed on a region R extending in a circumferential direction with respect to the rotation center shaft 151 and having a predetermined angle with reference to the rotation center shaft 151. The tapered surface 154 comes in contact with the rear end surface 138 of the push rod 130. Further. FIG. 8(A) is a front view of the taper-forming body 152, and FIG. 8(B) is a view taken along an arrow B in FIG. 8(A).

Figure 12:
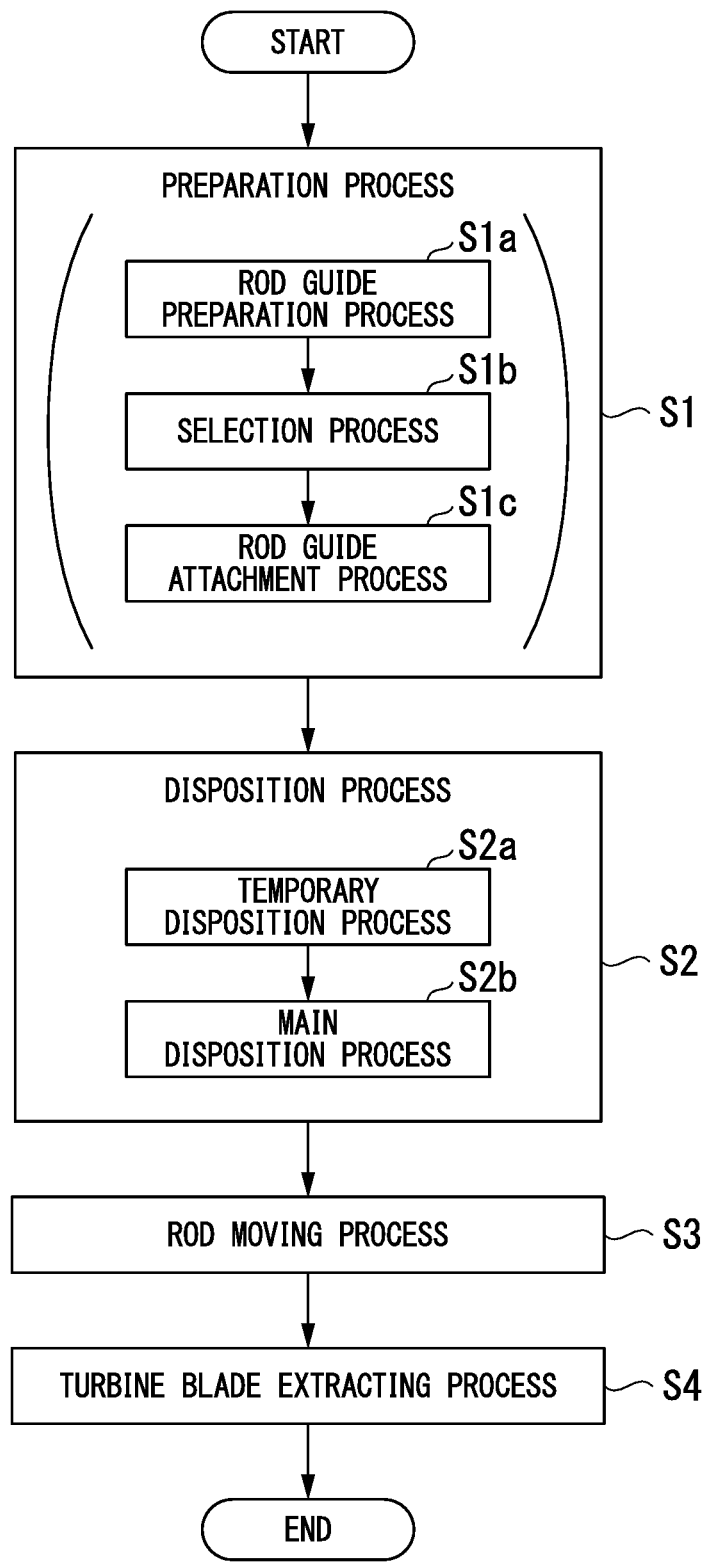
FIG. 12 is a flowchart showing a sequence of a method of removing a turbine blade of the embodiment according to the present invention.

Next, a method of removing the turbine blade 60 will be described according to a flowchart shown in FIG. 12.

First, the removal device 100 as described above is prepared (S1: a preparation process). In the plurality of disks 40 that constitute the rotor shaft 32 of the compressor 30, directions in which the blade root grooves 45 extend between the disks 40 are somewhat different, and sizes of the blade root grooves 45 are somewhat different. In this case, the rod guide 140 and the push rod 130 corresponding to the blade root grooves 45 of the disks 40 are preferably prepared (S1*a*: a rod guide preparation process). In this case, the rod guide 140 corresponding to the blade root groove 45 of the disk 40 (hereinafter, serving as the subject disk 40) to which the turbine blade 60 which is the removal subject (hereinafter, serving as the subject turbine blade 60) is attached is selected from the plurality of rod guides 140, and the push rod 130 corresponding to the selected rod guide 140 is selected from the plurality of push rods 130 (S1*b*: a selection process). As shown in FIG. 10, the rod guide 140 corresponding to the blade root groove 45 of the disk 40 is the rod guide 140 in which an angle in the U direction in which the guide hole 142 extends in the Z direction coincides with an angle in the inclination direction Di in which the blade root grooves 45 extend with respect to the axis Ar. In addition, the push rod 130 corresponding to the selected rod guide 140 is the push rod 130 in which the shell section 136 of the push rod 130 can be inserted into the guide hole 142 of the rod guide 140 and the outer circumferential surface of the shell section 136 comes in contact with the inner circumferential surface of the guide hole 142. Next, the push rod 130 selected in the selection process (S1*b*) is mounted in the guide hole 142 of the rod guide 140, and the rod guide 140 is fixed to the frame 110 by the screw 146 (S1*c*: a rod guide attachment process).

Further, in the embodiment, one or more disks 40, the subject turbine blade 60 and the removal device 100 are provided to constitute a rotor set.

Next, the base 101 of the removal device 100 is disposed such that the blade root 62 of the subject turbine blade 60 faces the pressing surface 135 of the push rod 130 (S2: a disposition process). In the disposition process (S2), first, the base 101 of the removal device 100 is disposed between the subject disk 40 and the disk 40 adjacent to the subject disk 40 in the axial direction Da (S2*a*: a temporary disposition process). Specifically, for example, as shown in FIGS. 5, 7 and 10, the base 101 is disposed between the subject disk 40 and the disk 40 on the upstream side Dau adjacent to the subject disk 40. The front surface 123 of the base 101 faces the front end surface 43 of the subject disk 40, and the front end surface 64 of the blade root 62 in the subject turbine blade 60 and the pressing surface 135 of the push rod 130 are disposed to face each other. Further, the arc surface 119*a* of the base 101 is disposed to come in contact with the outer circumferential surface of the disk 40. When the arc surface 119*a* of the base 101 comes in contact with the outer circumferential surface of the subject disk 40, the base 101 of the removal device 100 is restrained immovably in the (−) Y direction. The (−) Y direction is a radial direction of the subject disk 40 on the inner side Dri in this state.

Next, in the disposition process (S2), the operation rod 129 of the member separation mechanism 127 is operated, and the separation bolt 128 of the member separation mechanism 127 is screwed into the screw hole 113 of the front wall plate 111. When the separation bolt 128 is screwed into the screw hole 113, the pressing member 121 is pressed toward the front side Zf by the separation bolt 128, and the main plate 122 of the pressing member 121 is moved toward the front side Zf with respect to the frame 110 and comes in contact with the front end surface 43 of the subject disk 40. The separation bolt 128 is further screwed into the screw hole 113, and the main plate 122 of the pressing member 121 is attached to the front end surface 43 of the subject disk 40, That is, the front surface 123 of the base is attached to the front end surface 43 of the subject disk 40. When the main plate 122 of the pressing member 121 is attached to the front end surface 43 of the subject disk 40, the rear surface 116 of the base 101 is attached to the rear end surface 44 of the disk 40 on the upstream side Dau. As a result, the base 101 of the removal device 100 is restrained immovably in the Z direction with respect to the subject disk 40 (S2*b*: a main disposition process). Further, in the main disposition process (S2*b*), in a step in which the front surface 123 of the base 101, i.e., a surface of the pressing member 121 facing the front side Zf of the main plate 122 comes in contact with the front end surface 43 of the subject disk 40, a position of the base 101 of the removal device 100 is preferably finely adjusted such that the front end surface 64 of the blade root 62 in the subject turbine blade 60 and the pressing surface 135 of the push rod 130 face each other again. As described above, the disposition process (S2) is terminated.

When the disposition process (S2) is terminated, as shown in FIGS. 5 and 10, the blade root 62 of the subject turbine blade 60 and the pressing surface 135 of the push rod 130 face each other. Further, the Z direction of the removal device 100 coincides with the axial direction Da of the disks 40, and the U direction of the removal device 100 coincides with the inclination direction Di of the disks 40. Further, the Y direction of the removal device 100 coincides with the radial direction Dr of the disks 40, and the X direction of the removal device 100 substantially coincides with the circumferential direction Dc of the disks 40.

Figure 11:
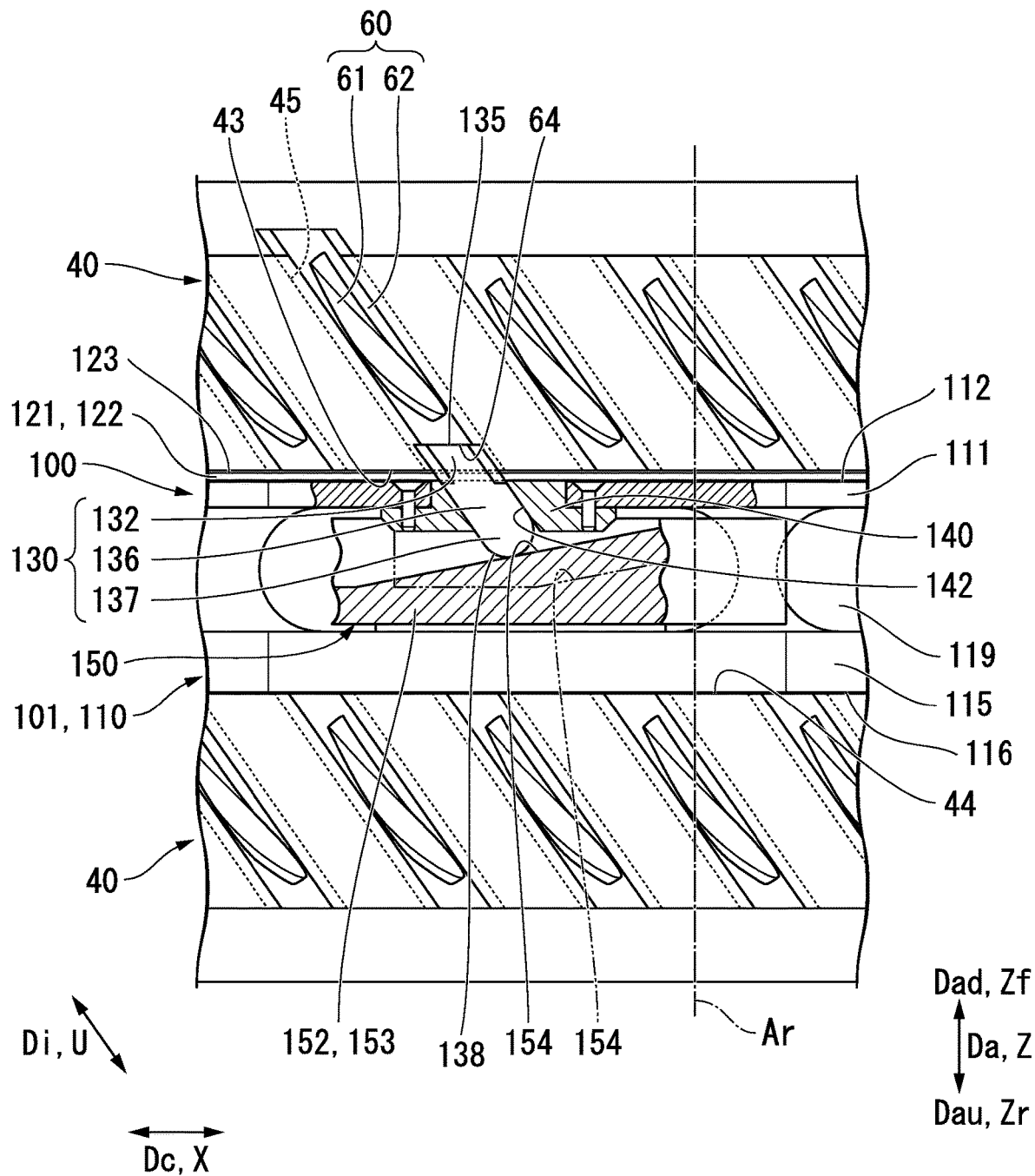
FIG. 11 is a plan view of the major parts of the disk, the turbine blade and the removal device after a rod-moving process in the embodiment according to the present invention.

Next, the push rod 130 is moved toward the front side Zf by the rod-moving mechanism 150 (S3: a rod-moving process). In the rod-moving process (S3), as shown in FIG. 6, the handle 155 of the taper-forming body 152 is operated, and the taper-forming body 152 is rotated about the rotation center shaft 151. When the taper-forming body 152 is rotated, the tapered surface 154 formed on the taper-forming body 152 is rotated about the rotation center shaft 151. The rear end surface 138 of the push rod 130 comes in contact with the tapered surface 154. For this reason, when the tapered surface 154 is rotated, as shown in FIG. 11, a contact position with the push rod 130 on the tapered surface 154 is varied. As a result, the push rod 130 is pushed out toward the front side Zf in the Z direction by the taper-forming body 152. The push rod 130 is moved toward the front side in the U direction because the moving direction is restrained in the U direction by the rod guide 140. When the push rod 130 is moved toward the front side in the U direction, the groove insertion section 132 of the push rod 130 protrudes from the front surface 123 of the base 101, and the pressing surface 135 of the push rod 130 comes in contact with the front end surface 64 of the blade root 62 in the turbine blade 60 of the removal subject. When the handle 155 of the taper-forming body 152 is further operated and the push rod 130 is moved toward the front side in the U direction, the groove insertion section 132 of the push rod 130 enters the blade root groove 45 of the subject disk 40. In this process, the subject turbine blade 60 is moved toward a front side (a downstream side) in the inclination direction Di. A moving amount of the turbine blade 60 in the inclination direction Di is larger than or equal to an outer diameter of the pins 58 (see FIG. 2). For this reason, the pin 58 is disconnected by movement of the subject turbine blade 60.

When the turbine blades 60 are moved in the inclination direction Di, a fixed state of the blade roots 62 with respect to the blade root grooves 45 is released, and the pins 58 that restrain movement of the turbine blades 60 are cut. For this reason, the turbine blades 60 can be easily moved in the inclination direction Di in which the blade root grooves 45 extend.

Next, the turbine blades 60 that can be easily moved in the inclination direction Di are further moved in the inclination direction Di, and the blade roots 62 of the turbine blades 60 exit from the blade root grooves 45 (S4: a turbine blade-extracting process). As described above, removal of the subject turbine blade 60 is terminated. Hereinafter, the other turbine blade 60 attached to the subject disk 40 is removed from the subject disk 40 in the same sequence as described above according to necessity. However, when the other turbine blades 60 are continuously removed, there is no necessity for performing the preparation process (S1) again.

The U direction (the second direction) of the removal device 100 after the disposition process (S2) is the inclination direction Di in which the blade root grooves 45 extend. For this reason, in the embodiment, since the turbine blades 60 can be pressed by the push rod 130 in the direction in which the blade root grooves 45 extend, the turbine blades 60 can be moved. Further, in the embodiment, as the tapered surface 154 is moved in the direction in which a virtual surface perpendicular to the Z direction widens, the push rod 130 can be moved toward the front side Zf. For this reason, in the embodiment, the turbine blades 60 can be moved without applying an impact load to the turbine blades 60. Accordingly, in the embodiment, the turbine blades 60 can be easily removed from the blade root grooves 45 without damaging the turbine blades 60.

In the embodiment, the handle 155 is operated and the taper-forming body 152 is rotated. For this reason, in the embodiment, a distance from the rotation center shaft 151 serving as a supporting point to the handle 155 serving as a force point is larger than a distance from the rotation center shaft 151 serving as a supporting point to the tapered surface 154 serving as a point of action. Accordingly, the taper-forming body 152 can be rotated with a small force. In other words, in the embodiment, the push rod 130 can be moved toward the front side Zf with a small force. For this reason, in the embodiment, from this point of view as well, the turbine blades 60 can be easily removed from the blade root grooves 45.

In the embodiment, since the tapered surface 154 extends in the circumferential direction with respect to the rotation center shaft 151, in comparison with the case in which the tapered surface 154 extends in a straight line, the taper-forming body 152 can be reduced in size.

In the embodiment, when the pressing member 121 of the movement-restraining mechanism 120 is moved in the Z direction by the member separation mechanism 127 of the movement-restraining mechanism 120, the front surface 123 of the base 101 comes in contact with an end surface of the disks 40 in the axial direction, and movement of the base 101 in the Z direction is restrained. Accordingly, in the embodiment, movement of the base 101 with respect to the disks 40 in the Z direction can be easily restrained.

In the embodiment, since the rod guide 140 and the push rod 130 can be modified according to the disks 40, versatility of the removal device 100 can be increased.

Further, while the removal device 100 is disposed on the upstream side Dau of the subject disk 40 as described above, the removal device 100 may be disposed on the downstream side Dad of the subject disk 40. In this case, the front surface 123 of the base 101 of the removal device 100 comes in contact with the rear end surface 44 of the subject disk 40.

In addition, a member having a tapered surface, a tool, a jig, or the like, may be temporarily attached to the base 101 as a taper-forming body, and the push rod 130 may be moved by moving them. In addition, the tapered surface is not limited to extending in the circumferential direction with respect to the rotation center shaft. For example, the tapered surface may straightly extend in a direction having elements of two directions or more of the X direction, the Y direction and the Z direction. For this reason, the taper-forming body on which the tapered surface is formed is moved in the direction including a component of a direction in which the tapered surface extends.

[First Variant of Rod-Moving Mechanism]

A first variant of the rod-moving mechanism 150 according to the embodiment will be described with reference to FIGS. 13 and 14.

Figure 14:
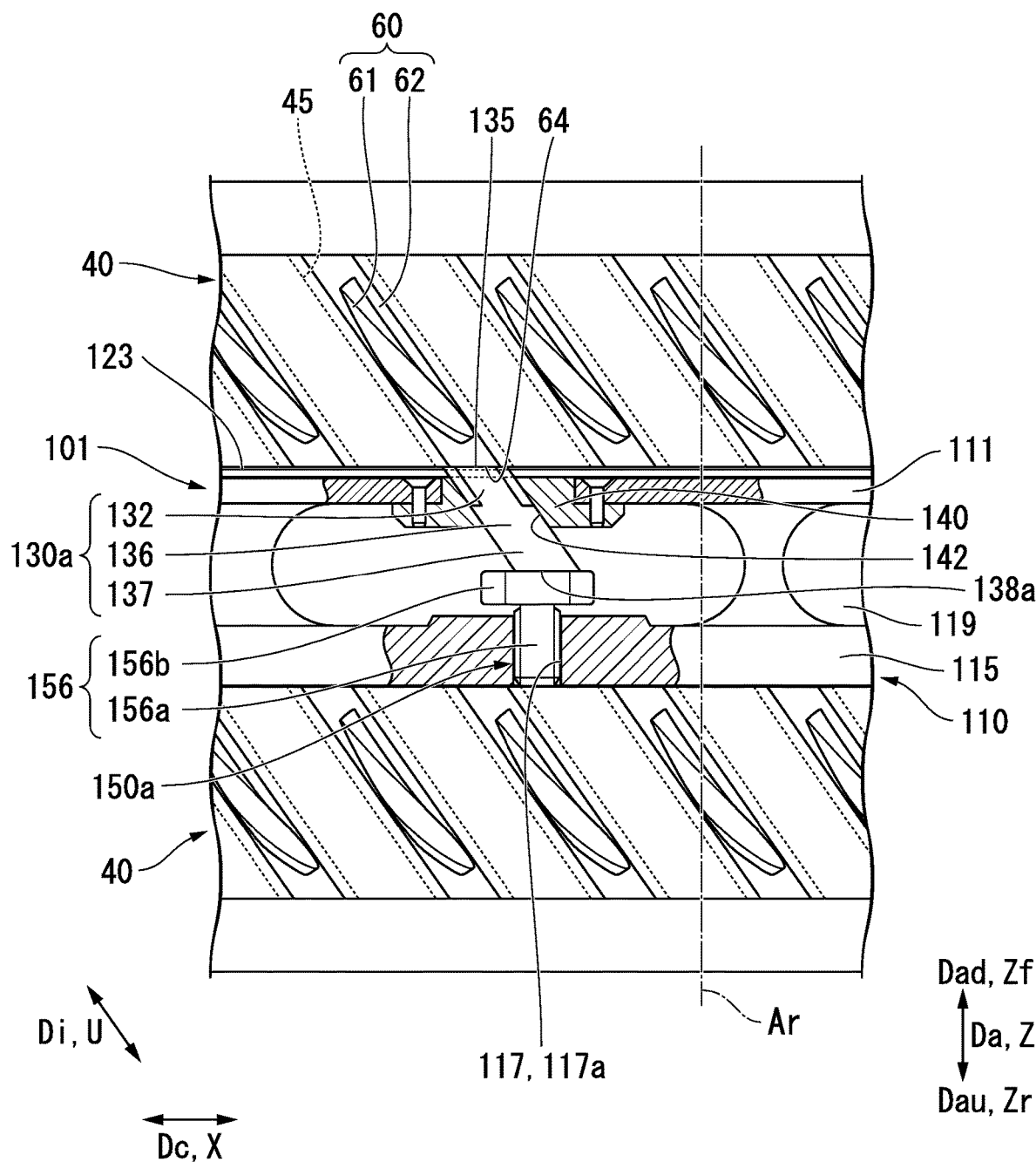
FIG. 14 is a plan view of major parts of a disk, a turbine blade and a removal device after a disposition process in the first variant of the embodiment according to the present invention.

As shown in FIG. 14, the rod-moving mechanism 150a of the variant has a rod-moving bolt 156, and a screw hole 117 formed on the frame 110. The rod-moving bolt 156 has a male screw section 156a, and a bolt head section 156b formed on an end portion of the male screw section 156a. The screw hole 117 extends in the Z direction. A female screw 117a into which the male screw section 156a can be threaded is formed in an inner circumferential surface of the screw hole 117. In addition, the screw hole 117 is formed at a position on the rear wall plate 115 of the frame 110 at which the bolt head section 156b is able to come in contact with the rear end surface 138a of the push rod 130a in a state in which the male screw section 156a of the rod-moving bolt 156 is screwed into the screw hole 117.

Figure 13:
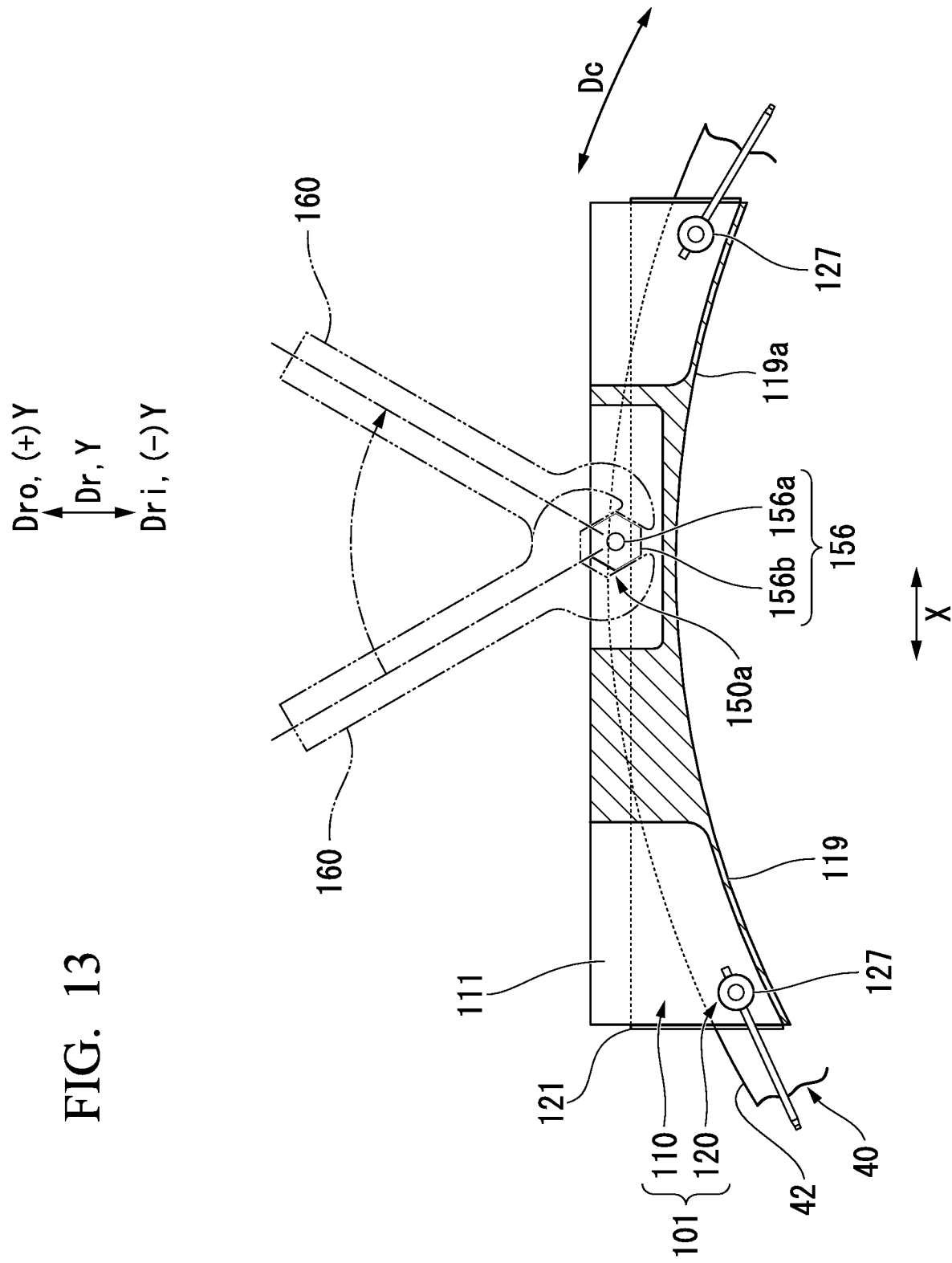
FIG. 13 is a front view of a removal device in a first variant of the embodiment according to the present invention, a major part of which is cut out.

In the rod-moving process of the variant, as shown in FIG. 13, a tool 160 such as a wrench or the like is mounted on the bolt head section 156b of the rod-moving bolt 156, and the rod-moving bolt 156 is rotated. The rod-moving bolt 156 is moved toward the front side Zf in the Z direction when rotated. The push rod 130a is pushed out toward the front side Zf according to movement of the rod-moving bolt 156 toward the front side Zf. The push rod 130a is moved toward the front side in the U direction because the moving direction is restrained to the U direction by the rod guide 140. When the push rod 130a is moved toward the front side in the U direction, the groove insertion section 132 of the push rod 130a protrudes from the front surface 123 of the base 101, the pressing surface 135 of the push rod 130a comes in contact with the front end surfaces 64 of the blade roots 62 in the turbine blades 60, and the push rod 130a presses the blade roots 62 of the turbine blades 60.

As described above, also in the variant, the turbine blades 60 can be pressed by the push rod 130a in the direction in which the blade root grooves 45 extend, and the turbine blades 60 can be moved. Further, in the variant, as the rod-moving bolt 156 is rotated, the push rod 130a can be moved to the front side Zf. For this reason, in the variant, the turbine blades 60 can be moved without applying an impact load to the turbine blades 60. Accordingly, in the variant, the turbine blades 60 can be easily removed from the blade root grooves 45 without damaging the turbine blades 60.

In the variant, the end surface of the bolt head section 156b in contact with the rear end surface 138a of the push rod 130a continuously maintains a state of being perpendicular to the Z direction even when the rod-moving bolt 156 is rotated. For this reason, the rear end surface 138a of the push rod 130a according to the variant is different from in the embodiment and forms a plane perpendicular to the Z direction.

[Second Variant of Rod-Moving Mechanism]

Figure 15:
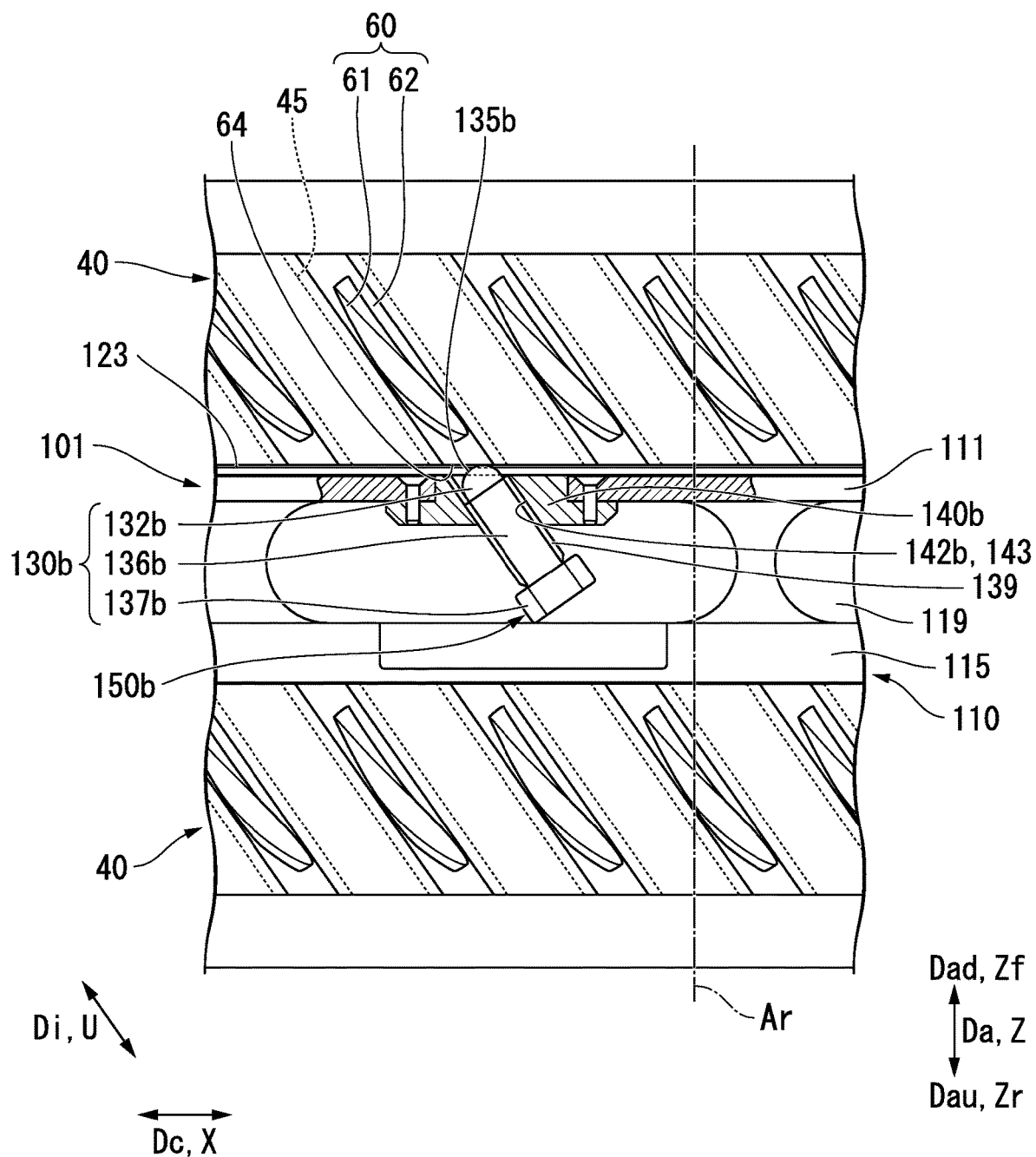
FIG. 15 is a plan view of major parts of a disk, a turbine blade and a removal device after a disposition process in a second variant of the embodiment according to the present invention.

A second variant of the rod-moving mechanism 150 according to the embodiment will be described with reference to FIG. 15.

The rod-moving mechanism 150b of the variant has a male screw 139 formed on the push rod 130b, and a female screw 143 formed in the rod guide 140b.

In the variant, a bolt is used as the push rod 130b. The push rod 130b serving as a bolt has a screw section 136b on which the male screw 139 that forms a portion of the rod-moving mechanism 150b is formed, a bolt head section 137b formed on a first end portion of the screw section 136b, and a tip portion 132b formed on a second end portion of the screw section 136b. The tip portion 132b has a hemispherical shape protruding toward an opposite side to the bolt head section 137b with reference to the screw section 136b. In the variant, a surface of the tip portion 132b forms the pressing surface 135b that presses the blade roots 62. Like the rod guide 140 of the embodiment, the guide hole 142b passing therethrough in the U direction is formed in the rod guide 140b of the variant. However, the female screw 143 into which the male screw 139 of the push rod 130b can be threaded is formed in the inner circumferential surface of the guide hole 142b of the variant.

In the rod-moving process of the variant, a tool such as a wrench or the like is mounted on the bolt head section 137b of the push rod 130b, and the push rod 130b is rotated. The push rod 130b is moved toward the front side in the U direction according to rotation thereof. When the push rod 130b is moved toward the front side in the U direction, the pressing surface 135b of the push rod 130b comes in contact with the front end surfaces 64 of the blade roots 62 of the turbine blades 60, and the push rod 130b presses the blade roots 62 of the turbine blades 60.

As described above, also in the variant, the turbine blades 60 can be pressed by the push rod 130b in the direction in which the blade root grooves 45 extend, and the turbine blades 60 can be moved. Further, in the variant, when the push rod 130b is rotated, the push rod 130b can be moved toward the front side Zf. For this reason, in the variant, the turbine blades 60 can be moved without applying an impact load to the turbine blades 60. Accordingly, also in the variant, the turbine blades 60 can be easily removed from the blade root grooves 45 without damaging the turbine blades 60.

[Third Variant of Rod-Moving Mechanism]

Figure 16:
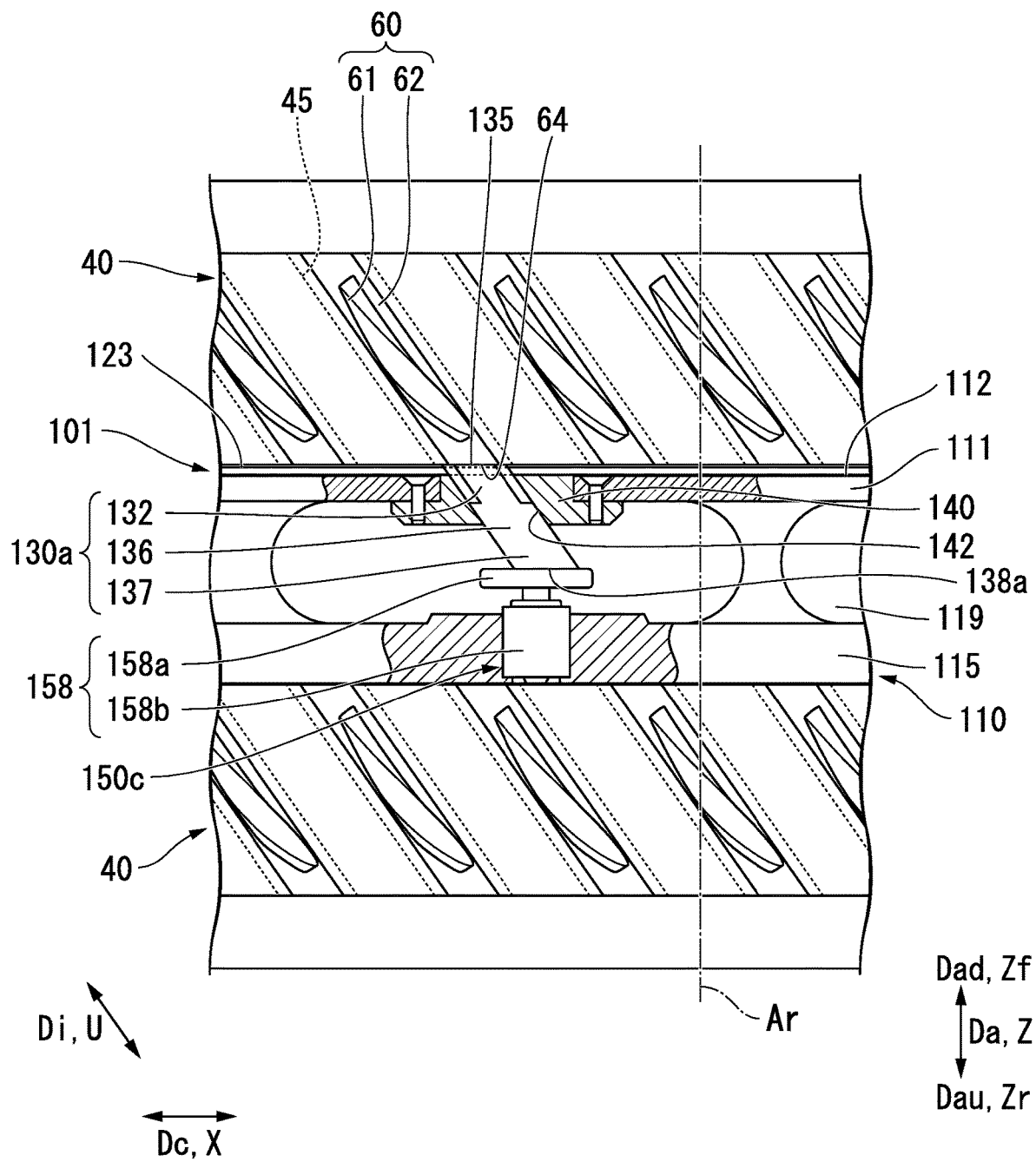
FIG. 16 is a plan view of major parts of a disk, a turbine blade and a removal device after a disposition process in a third variant of the embodiment according to the present invention.

A third variant of they rod-moving mechanism 150 according to the embodiment will be described with reference to FIG. 16.

The rod-moving mechanism 150c of the variant has a hydraulic cylinder 158. The hydraulic cylinder 158 has a cylinder casing 158b, and a cylinder head 158a that moves relative to the cylinder casing 158b.

The cylinder casing 158b is attached to the rear wall plate 115 of the frame 110 such that a moving direction of the cylinder head 158a is the Z direction and the cylinder head 158a can come in contact with the rear end surface 138a of the push rod 130a.

In the rod-moving process of the variant, the hydraulic cylinder 158 is driven. The cylinder head 158a is moved toward the front side Zf in the Z direction by driving of the hydraulic cylinder 158. The push rod 130a is pushed out toward the front side Zf by movement of the cylinder head 158a toward the front side Zf. The push rod 130a is moved toward the front side in the U direction because the moving direction is restrained to the U direction by the rod guide 140. When the push rod 130a is moved toward the front side in the U direction, the pressing surface 135 of the push rod 130a abuts the front end surfaces 64 of the blade roots 62 of the turbine blades 60, and the push rod 130a presses the blade roots 62 of the turbine blades 60.

As described above, also in the variant, the turbine blades 60 can be pressed by the push rod 130a in the direction in which the blade root grooves 45 extend, and the turbine blades 60 can be moved. Further, in the variant, the push rod 130a can be moved toward the front side Zf by driving the hydraulic cylinder 158 and moving the cylinder head 158a. For this reason, in the variant, the turbine blades 60 can be moved without applying an impact load to the turbine blades 60. Accordingly, also in the variant, the turbine blades 60 can be easily removed from the blade root grooves 45 without damaging the turbine blades 60.

Further, in the variant, the cylinder casing 158b is attached to the frame 110 such that the moving direction of the cylinder head 158a is the Z direction. However, the cylinder casing 158b may be attached to the frame 110 such that the moving direction of the cylinder head 158a is the U direction.

Further, in the variant, the hydraulic cylinder 158 is used as the rod-moving mechanism 150c. However, another actuator such as a pneumatic cylinder, an electromagnetic actuator, or the like, may be used instead of the hydraulic cylinder 158.

[Other Variants]

In the member separation mechanism 127 according to the embodiment, one pressing member 121 is installed with respect to two separation bolts 128. However, two pressing members may be installed with respect to the two separation bolts 128. In this case, one pressing member is fixed to a tip of the one separation bolt 128.

The main plate 122 of the pressing member 121 according to the embodiment is disposed on the front side Zf of the frame 110. However, the main plate 122 of the pressing member 121 may be disposed on the rear side Zr of the frame 110. In this case, the front surface 112 of the frame 110 becomes a front surface of the base 101, and a surface of the pressing member 121 facing the rear side Zr becomes a rear surface of the base 101.

The movement-restraining mechanism 120 according to the embodiment has the pressing member 121 and the member separation mechanism 127. However, the movement-restraining mechanism 120 may be only the pressing member 121. In this case, a plurality of pressing members 121 having different thicknesses are provided, any one of the plurality of pressing members 121 is selected, and the selected pressing member 121 is disposed on the front surface 112 or the rear surface 116 of the frame 110, and thus, the base 101 including the frame 110 and the pressing member 121 may be restrained immovably in the Z direction with respect to the disks 40. When the pressing member 121 is disposed on the front surface 112 of the frame 110, a surface of the pressing member 121 facing the front side Zf becomes a front surface of the base 101.

In addition, when the pressing member 121 is disposed on the rear side Zr of the frame 110, the front surface 112 of the frame 110 becomes a front surface of the base 101. Further, the pressing member 121 may be formed integrally with the frame 110. In addition, the pressing member 121 according to the embodiment is a plate-shaped member. However, the pressing member may be, for example, a bolt or the like having a male screw formed on a shaft section thereof. A screw hole extending in a direction including a component of the Z direction is formed in the frame 110. A female screw with which a male screw of the bolt or the like can be threadedly engaged is formed in the screw hole. In this case, as a screwing amount of the bolt or the like with respect to the frame 110 is changed, the base including the frame 110, the bolt, and so on, is restrained immovably in the Z direction with respect to the disks 40. In this way, the pressing member may have any function as long as the pressing member has a function of restraining the base immovably with respect to the disks 40.

The base 101 according to the embodiment has the movement-restraining mechanism 120. However, the movement-restraining mechanism 120 may be omitted. In this case, in order to restrain movement of the frame 110 in the Z direction, a width dimension of the frame 110 in the Z direction needs to coincide with an interval dimension between respective disks 40 neighboring in the axial direction Da. Accordingly, a use of the removal device, from which the movement-restraining mechanism 120 is omitted, is limited for removal of the turbine blade 60 attached to a specified disk 40.

All of the embodiment and the variants thereof are examples for removing the turbine blade 60 in the compressor 30 of the gas turbine. However, the removal subject of the present invention is not limited to the turbine blade 60 in the compressor 30 of the gas turbine. A turbine blade of another rotary machine may be a removal subject.

INDUSTRIAL APPLICABILITY

According to the aspect of the present invention, a turbine blade can be easily removed from a blade root groove without damaging the turbine blade.

REFERENCE SIGNS LIST

1 Gas turbine
2 Gas turbine rotor
5 Gas turbine casing
10 Turbine
11 Turbine rotor
12, 32 Rotor shaft
13, 33 Turbine blade row
15 Turbine casing
17, 37 Turbine vane row
20 Combustor
30 Compressor
31 Compressor rotor
35 Compressor casing
39 Air compression flow path
40 Disk
41 Turbine blade attachment section
42 Gas path surface
43 Front end surface
44 Rear end surface
45 Blade root groove
48 Groove bottom surface
49 Pin hole
58 Pin
59 Spring
60 Turbine blade
61 Blade body
62 Blade root
63 Gas path surface
64 Front end surface
65 Rear end surface
69 Pin hole
100 Removal device
101 Base
110 Frame
111 Front wall plate
112 Front surface
113 Screw hole
114 Guide-mounting hole
115 Rear wall plate
116 Rear surface
117 Screw hole
117a Female screw
119 connecting section
119a Arc surface
120 Movement-restraining mechanism
121 Pressing member
122 Main plate
123 Front surface (of base)
124 Side plates
125 Removal prevention plate
127 Member separation mechanism
128 Separation bolt
129 Operation rod
130, 130a, 130b Push rod
132 Groove insertion section
132b Tip portion
135, 135b Pressing surface
136 Shell section
136b Screw section
137 Transition section
137b Bolt head section
138, 138a Rear end surface
139 Male screw
140, 140b Rod guide
141 Main body section
142, 142b Guide hole
143 Female screw
145 Flange section
146 Screw (fixing tool)
150, 150a, 150b, 150c Rod-moving mechanism
151 Rotation center shaft
152 Taper-forming body
153 Rotating plate
154 Tapered surface
155 Handle
156 Rod-moving bolt
156a Male screw section
158 Hydraulic cylinder (actuator)
Da Axial direction
Dau Upstream side
Dad Downstream side
Dc Circumferential direction
Dr Radial direction
Dri Inner side in radial direction
Dro Outer side in radial direction
Di Inclination direction
Z Z direction (first direction)
Zf Front side
Zr Rear side
U U direction (second direction)

The invention claimed is:

1. A removal device for a turbine blade, comprising:
a base restrained immovably toward a front side and a rear side with respect to a rotor shaft which supports the turbine blade, the front side being one side in a first direction in which an axis of the rotor shaft extends, the rear side being an opposite side in the first direction;
a push rod that is able to protrude from a front surface of the base facing the front side;
a rod-moving mechanism installed on the base and configured to move the push rod toward the front side; and
a rod guide attached to the base and configured to guide movement of the push rod by the rod-moving mechanism in a second direction that forms an acute angle with respect to the first direction, wherein the rod-moving mechanism has a taper-forming body on which a tapered surface is formed so as to face the front side and so as to be inclined with respect to a virtual surface perpendicular to the first direction, and the taper-forming body is provided on the base such that the tapered surface is relatively movable, in a plane parallel to the virtual surface, with respect to an end surface of the rear side of the push rod while coming in contact with the end surface.

2. The removal device for a turbine blade according to claim 1, wherein the base has a frame on which the rod-moving mechanism is installed and to which the rod guide is attached, and a movement-restraining mechanism configured to restrain movement of the frame in the first direction, the movement-restraining mechanism has a pressing member having at least a portion that is disposed on the front side or the rear side opposite to the front side with respect to the frame, the base has a first movement-restraining mechanism that is the movement-restraining mechanism, and a second movement-restraining mechanism configured to restrain movement of the frame in a third direction perpendicular to the first direction and the second direction, the second movement-restraining mechanism has an arc surface that is a surface facing one side in the third direction, is disposed on the one side in the third direction with respect to the base and is formed in an arc shape about a virtual axis extending in the first direction, the rod guide has a guide hole passing therethrough in the second direction and with which the push rod is able to come in sliding contact, and the rod guide is detachably attached to the base.

3. The removal device for a turbine blade according to claim 1, wherein the rod-moving mechanism has a rotation center shaft, the taper-forming body is attached to the rotation center shaft to be rotatable about the rotation center shaft, and the tapered surface extends in a circumferential direction with respect to the rotation center shaft.

4. The removal device for a turbine blade according to claim 3, wherein the taper-forming body has a rotating plate that rotates about the rotation center shaft, and a handle extending from an outer circumference of the rotating plate in a radial direction with respect to the rotation center shaft, and the tapered surface is formed on the rotating plate.

5. A rotor set, comprising:

the removal device for a turbine blade according to claim 1;

a rotor shaft; and a plurality of turbine blades attached to an outer circumferential side of the rotor shaft, wherein each of the plurality of turbine blades has a blade body extending in the radial direction with respect to the rotor shaft and forming a blade profile, and a blade root formed inside the blade body in the radial direction, a blade root groove recessed from the outside in the radial direction toward the inside in the radial direction, extending in an inclination direction that forms an acute angle with respect to an axial direction in which the rotor shaft extends, and into which the blade root is inserted, is formed in the rotor shaft, and an angle formed by the second direction with respect to the first direction coincides with an angle formed by the inclination with respect to the axial direction.

6. A rotor set, comprising:

the removal device for a turbine blade according to claim 1;

a rotor shaft; and a plurality of turbine blades attached to an outer circumferential side of the rotor shaft, wherein each of the plurality of turbine blades has a blade body extending in a radial direction with respect to the rotor shaft and forming a blade profile, and a blade root installed inside the blade body in the radial direction, a blade root groove recessed from the outside in the radial direction toward the inside in the radial direction, extending in an inclination direction that forms an acute angle with respect to an axial direction in which the rotor shaft extends, and into which the blade root is inserted, is formed in the rotor shaft, an angle formed by the second direction with respect to the first direction coincides with an angle formed by the inclination direction with respect to the axial direction, the removal device has a second rod guide in addition to a first rod guide that is the rod guide, and the second rod guide has a second guide hole having a different shape from that of the guide hole of the first rod guide.

\* \* \* \* \*